(12) United States Patent
Leivent

(10) Patent No.: US 6,594,751 B1
(45) Date of Patent: Jul. 15, 2003

(54) METHOD AND APPARATUS FOR POINTER RELOCATION OPTIMIZATION FOR VIRTUAL MEMORY MAPPING AND TRANSACTION MANAGEMENT IN A DATABASE SYSTEM

(75) Inventor: Jonathan I. Leivent, Burlington, MA (US)

(73) Assignee: Progress Software Corporation, Bedford, MA (US)

( * ) Notice: Subject to any disclaimer, the term of this patent is extended or adjusted under 35 U.S.C. 154(b) by 0 days.

(21) Appl. No.: 09/535,520

(22) Filed: Mar. 24, 2000

Related U.S. Application Data

(60) Provisional application No. 60/126,103, filed on Mar. 25, 1999.

(51) Int. Cl.[7] .............................................. G06F 12/08
(52) U.S. Cl. ....................................... 711/209; 711/118
(58) Field of Search ............................. 711/3, 202, 203, 711/209, 213, 206, 118; 709/240; 710/9

(56) References Cited

U.S. PATENT DOCUMENTS

| | | | | |
|---|---|---|---|---|
| 5,426,747 A | * | 6/1995 | Weinreb et al. | 711/203 |
| 5,509,131 A | * | 4/1996 | Smith et al. | 711/206 |
| 5,619,723 A | * | 4/1997 | Jones et al. | 710/3 |
| 5,649,139 A | * | 7/1997 | Weinreb et al. | 711/202 |
| 5,815,415 A | * | 9/1998 | Bentley et al. | 364/578 |
| 5,881,379 A | * | 3/1999 | Beier et al. | 711/100 |
| 6,073,228 A | * | 6/2000 | Holmqvist et al. | 711/200 |
| 6,094,686 A | * | 7/2000 | Sharma | 709/240 |
| 6,128,717 A | * | 10/2000 | Harrison et al. | 711/202 |

OTHER PUBLICATIONS

"Generalized Scheme for Control Block Relocation", IBM Technical Disclosure Bulletin, vol. 15, pp. 0980–2983, Feb. 1973.*

* cited by examiner

Primary Examiner—Matthew Kim
Assistant Examiner—Pierre-Michel Bataille
(74) Attorney, Agent, or Firm—Perkins, Smith & Cohen, LLP; Stephen Y. Chow; Jerry Cohen

(57) ABSTRACT

There is provided an apparatus and a method for virtual memory mapping and transaction management for an object-oriented data base system having at least one permanent storage means for storing data and at least one data base, at least one cache memory for locally storing data addressed by physical addresses, and a processing unit including means for requesting data utilizing virtual addresses to access data in the cache memory, means for mapping virtual addresses to physical addresses and means for retaining the cached data after the conclusion of a transaction. The apparatus and method further provide that data retained in the cache across transactions will often not need further translation, referred to as forward relocation. The ability to make cached data usable across a sequence of transactions often without requiring further translation, while also providing that the total working set size of this data may be much larger than what can fit into a client computer's address space at any one time is referred to as relocation optimization, and is the primary advantage of this method. The method makes use of a single queue containing elements representing managed entities (pages, address space bindings) which orders the entities roughly by recency of use, and recycles address space of the least-recently used bindings in a way that preserves the validity of bindings necessary for the proper function of the client application with minimal overhead.

6 Claims, 15 Drawing Sheets

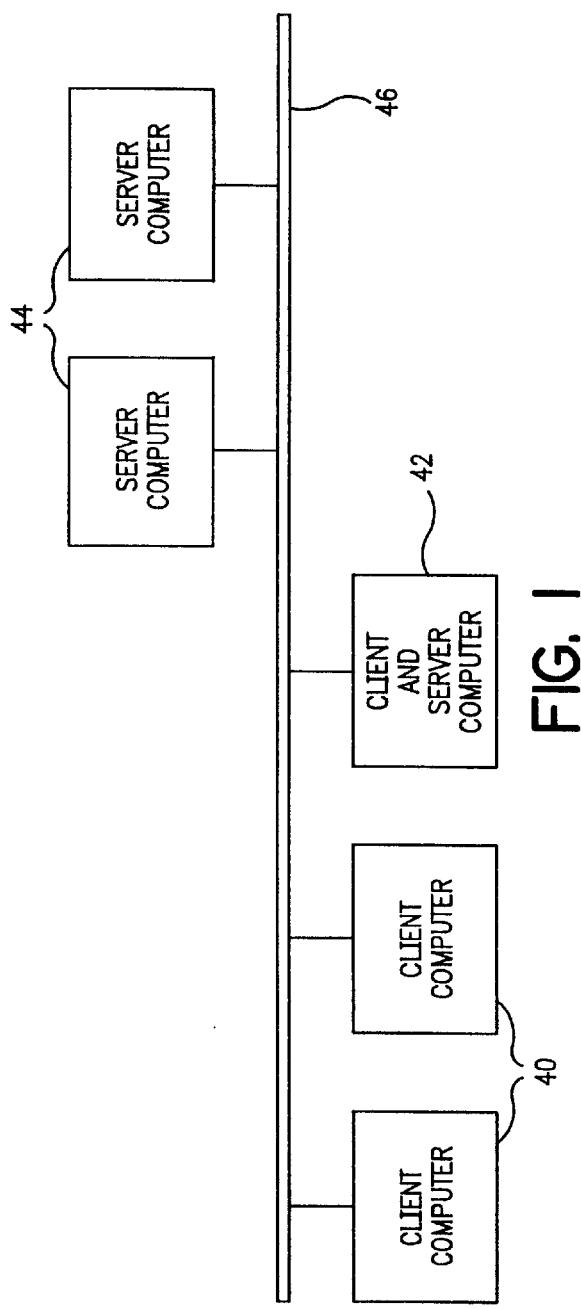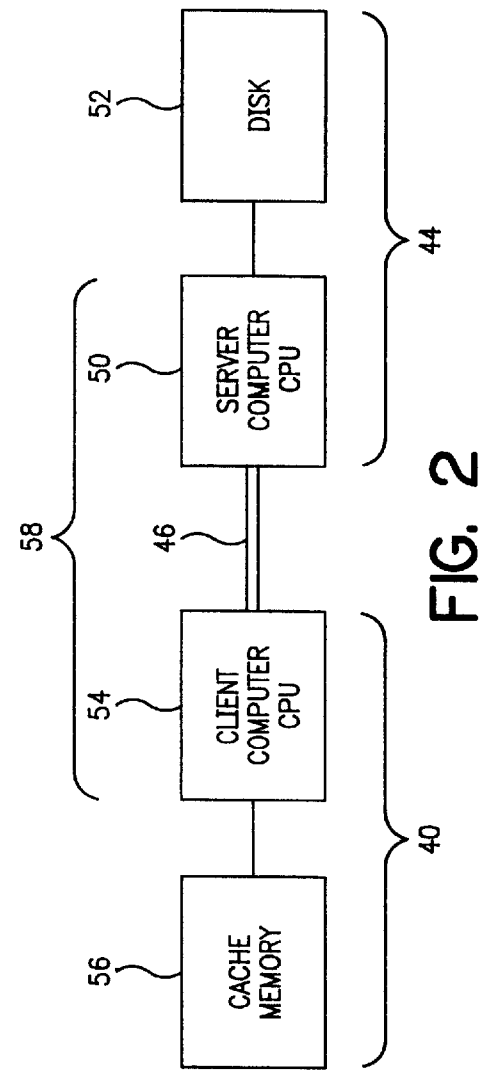

FIG. 8A
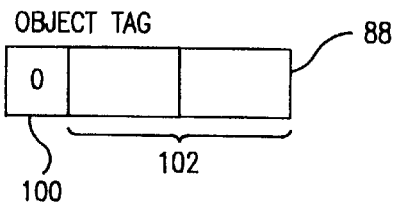
FIG. 8B
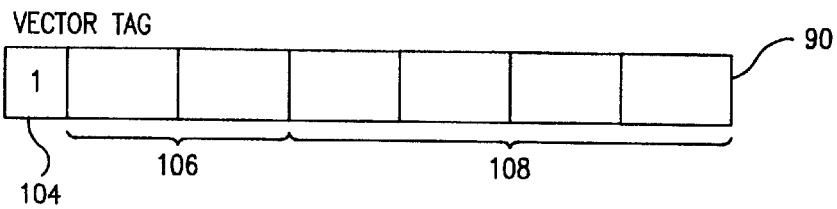
FIG. 8C
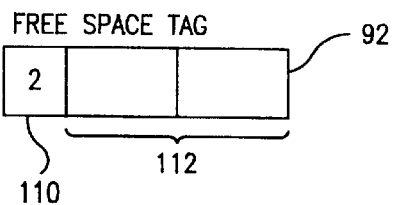
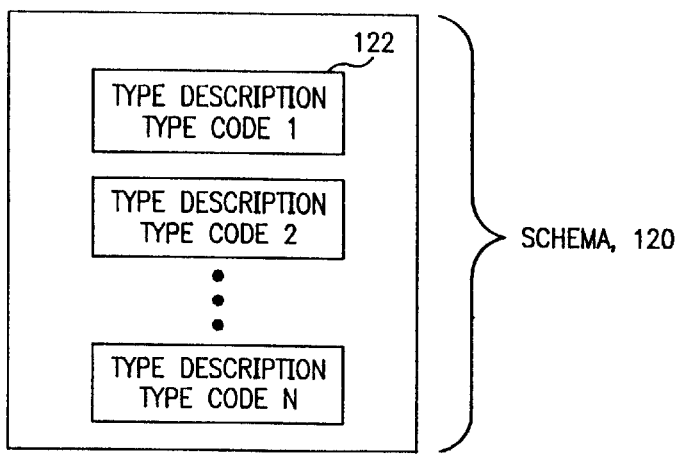
FIG. 9

| PAGE;CLUSTER;SEGMENT;DATABASE | OWNER(S) | STATUS |
|---|---|---|
| 5; 4; a/b/c | '1' | 'R' |
| ⋮ | | |

192 { (row)

OWNERSHIP TABLE, 190

194 — PAGE;CLUSTER;SEGMENT;DATABASE
196 — OWNER(S)
198 — STATUS

200 VIRTUAL ADDRESS SPACE:
- 20,000 — DATABASE A SEGMENT 6 CLUSTER 2 OFFSET 0 LENGTH: 10,000
- 30,000

212 VIRTUAL ADDRESS MAP ENTRY (VAME):
- D:A — 214
- S:6 — 216
- C:2 — 217
- O:0 — 218
- L:10,000 — 220
- A:20,000 — 222

210 VIRTUAL ADDRESS MAP (VAM)

| OTHER | DATABASE SEGMENT | PHYSICAL |
|---|---|---|
| •••<br>176,178,<br>182,184,<br>185 | 174 | 172 |

CACHE DIRECTORY, 180

FIG. 16A

| OTHER | VIRTUAL | PHYSICAL |
|---|---|---|
| (226,<br>227)<br>••• | 225 | 228 |

VIRTUAL MEMORY MAP, 224

FIG. 16B

| OTHER | DATABASE SEGMENT | VIRTUAL |
|---|---|---|
| •••<br>222 | 214,216,217,218 | 222 |

VIRTUAL ADDRESS MAP, 210

FIG. 16C

METHOD AND APPARATUS FOR POINTER RELOCATION OPTIMIZATION FOR VIRTUAL MEMORY MAPPING AND TRANSACTION MANAGEMENT IN A DATABASE SYSTEM

CROSS-REFERENCE TO RELATED APPLICATIONS

This application claims priority of U.S. provisional application Serial No. 60/126,103 entitled, "Method and Apparatus for Pointer Relocation Optimization for Virtual Memory Mapping and Transaction Management in a Database System" filed Mar. 25, 1999 by the present applicant.

FIELD OF THE INVENTION

This invention relates generally to computer systems and more particularly to pointer management in a database system using virtual memory mapping having a plurality of caches having persistent data.

BACKGROUND OF THE INVENTION

In object-oriented database systems, and any other systems having large numbers of inter-connected objects, inter-object references, sometimes called pointers, provide a complex structure providing access to the stored objects. Application programs, in accessing the object-oriented database, consume time by accessing and updating objects, following the intricate connections between objects, using both associative queries and direct traversal through the database, and performing some amount of computation as each object is visited.

Typical application areas for object-oriented databases are computer-aided design, manufacturing, and engineering, software development, electronic publishing, multimedia office automation, and geographical information systems. All of these application environments demand that an object-oriented database system be fast.

A typical object-oriented database system has a number of work stations or some other type of client computer connected through a server to the object-oriented database. Each client computer has its own cache memory in which data required by a client application program is placed.

Every object-oriented database system has some way to identify an object. Currently, some systems use an "object identifier" (OID), which embodies a reference to an object. Some systems use pointers. An operation called "dereferencing", finds an object by following a pointer to the object and by making the object available to a requesting application.

Accessing data in the database involves copying the data into a cache memory of a client system. The cached data in some current systems is frequently discarded after the completion of a transaction because the pointers referencing the cached data become obsolete. Discarding the cached data insures consistency of data, but it increases communication between the client and the server computer. It also fails to make use of the principles of locality which encourage the use of a cache in the first place. Persistent data in the cache, however, requires a way to keep the data and the pointers referencing the data consistent with the database.

It remains desirable to have a way to update the data reference pointers in order to allow caching of persistent data in a form in which the dereferencing operation can be performed at high speed.

It is an object of the present invention to provide a method and apparatus for persistent caching of data in an object-oriented database system.

It is another object of the present invention to provide a method and apparatus having optimized pointer relocation for cached data.

It is another object of the present invention to provide a method and apparatus for optimized pointer relocation in virtual memory mapping architecture for an object-oriented database system.

SUMMARY OF THE INVENTION

The problems of pointer relocation optimization for persistent cached data are solved by the present invention of a method and apparatus for pointer relocation optimization for virtual memory mapping and transaction management in a database system.

There is provided an apparatus and a method for virtual memory mapping and transaction management for an object-oriented data base system having at least one permanent storage means for storing data and at least one data base, at least one cache memory for locally storing data addressed by physical addresses, and a processing unit including means for requesting data utilizing virtual addresses to access data in the cache memory, means for mapping virtual addresses to physical addresses and means for retaining the cached data after the conclusion of a transaction. Typically, the system has a plurality of client computers each having a cache memory, interconnected by a network, and each permanent storage means has a server computer. A single computer may serve as both a client computer and a server computer. The apparatus operates by relocating pointers to cached data in order to provide the client application with an efficient dereferencing operation. The apparatus further operates by maintaining the relocated pointers across a succession of transactions against the data held in the cache. The apparatus achieves its optimization benefits by reducing the frequency of pointer relocation maintenance operations to a minimum.

The relocation operations can be segregated into three categories: inbound relocation, forward relocation, and outbound relocation. Inbound relocation involves the translation of pointers on a page from their external format to a format and state usable by the client application. Inbound relocation occurs once for each occurrence of a database page entering the client cache. Forward relocation involves the translation of pointers on a page from a state, created by either inbound relocation or a previous forward relocation, that is no longer immediately usable by the client application to a state that is presently usable by the client application. Forward relocation of a particular page occurs at most once for each occurrence of a transaction in which the page is either read or modified, other than the first such transaction in which the page first enters the cache. Outbound relocation involves the translation of pointers from the form usable by the client application to their external form. Outbound relocation of a particular page occurs at the end of a successful transaction in which the page was modified, or when a modified page must otherwise be evicted from the cache. An advantage of the present invention is the management of address space used by the client application so as to decrease the number of forward relocations required across a succession of transactions.

The present invention together with the above and other advantages may best be understood from the following detailed description of the embodiments of the invention illustrated in the drawings, wherein:

BRIEF DESCRIPTION OF THE DRAWINGS

FIG. 1 is a block diagram of a typical distributed database system configuration in which the present invention may be utilized;

FIG. 2 is a more detailed block diagram of a portion of the system shown in FIG. 1 with separate data repositories at server computers and client computers;

FIGS. 8A–8C are diagrams showing the data structures for three different object tags;

FIG. 9 is a diagram showing the data structure for a schema;

FIGS. 16A–16C are diagrams illustrating the relationship between the cache directory, the virtual memory map and the virtual address map;

DETAILED DESCRIPTION OF PREFERRED EMBODIMENTS

Figure 3:
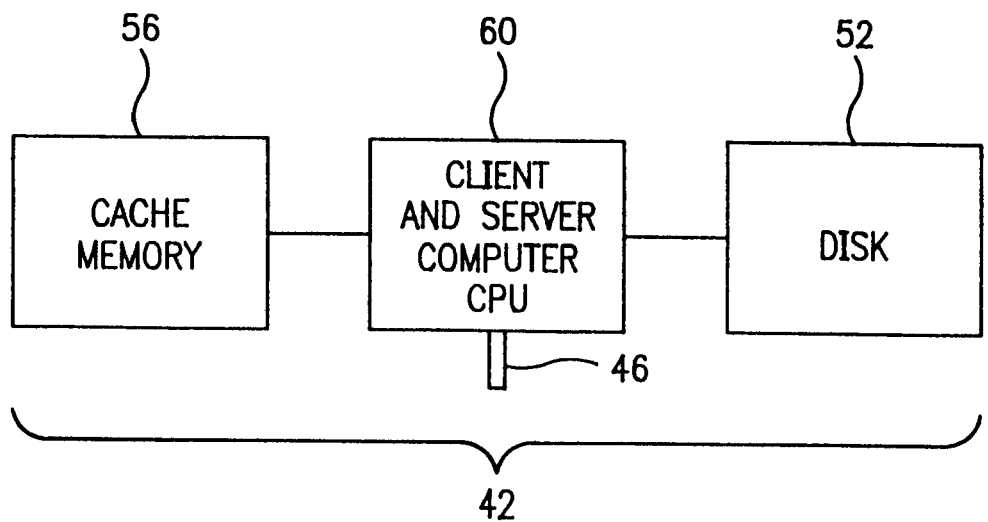
FIG. 3 is a more detailed block diagram of a system portion with a permanent repository of data and client on one computer.

FIGS. 1–4 illustrate a representative basic computer system in which the pointer relocation optimization for a virtual memory mapping method and apparatus of the present invention may be utilized.

FIG. 1 illustrates a system in which a plurality of client computers 40, a client and server computer 42 and one or more server computers 44, are connected together by a computer network 46 or other communication path such as a computer bus. A client computer 40 is used directly by a user and runs various application software. A server computer 44 acts as a permanent repository of data held in a database. In general, any client computer 40 can access data stored on any server computer 44. Some computers 42 act as both a client computer and a server computer. Such a computer 42 can access data stored on itself, as well as on other server computers 44. Other client computers 40 can also access data on a client and server computer 42. The database method and apparatus of the present invention can be used on a system that has at least one client and server computer 42 or at least one each of a client computer 40 and server computer 44 connected by a computer network or communication path 46. For simplicity, a client computer 40 or a computer 42 when acting as a client computer will be referred to as a "client" and a server computer 44 or a computer 42 acting as a server will be referred to as a "server".

FIG. 2 is a more detailed diagram of a simplified minimum system which may be used in practicing the present invention. Similar reference numbers depict similar structures throughout the drawings. A server computer 44 comprises a central processing unit (CPU) 50 connected to a disk or other mass storage medium 52 which is a permanent repository of data for one or more databases. CPU 50 moves data between disk 52 and network 46. Client computer 40 has a central processing unit (CPU) 54 which moves data between network 46 and its cache memory 56. CPU 54 also controls the virtual address space which is mapped to the physical addresses of the cache 56. An application running on a client computer 40 will manipulate data in its database by reading, writing, creating and deleting data in the cache memory 56. A client 40 performs all such manipulations on data in its cache memory 56 rather than by performing transactions across computer network 46 on data stored on a server computer 44 as is done in standard distributed database systems. When a transaction is completed at a client computer 40 on data in its cache memory 56, the results of those transactions are transferred across the network 46 to the permanent repository, or disk, 52 on the server computer 44. The method of interaction between a client computer 40 and server computer 44 is the same regardless of the number of server computers 44 and client computers 40 on a communication network.

FIG. 3 depicts the special case of a combined client and server computer 42. Such a computer can be used in the place of either a client computer 40 or server computer 44 as depicted in FIG. 2. Such a computer also may act as both a typical server computer 44 and as a typical client computer 40 in the mode of operations described in conjunction with FIG. 2.

A client and server computer 42 may also handle interactions between its cache memory 56 and its permanent data repository 52 via central processing unit (CPU) 60. This interaction is similar to the interaction of the combination 58 (FIG. 2) of a server computer CPU 50, client computer CPU 54 and a communication network 46. The cache memory 56 in a client and server computer 42 provides the same function as cache memory 56 of a typical client computer 40.

Figure 4:
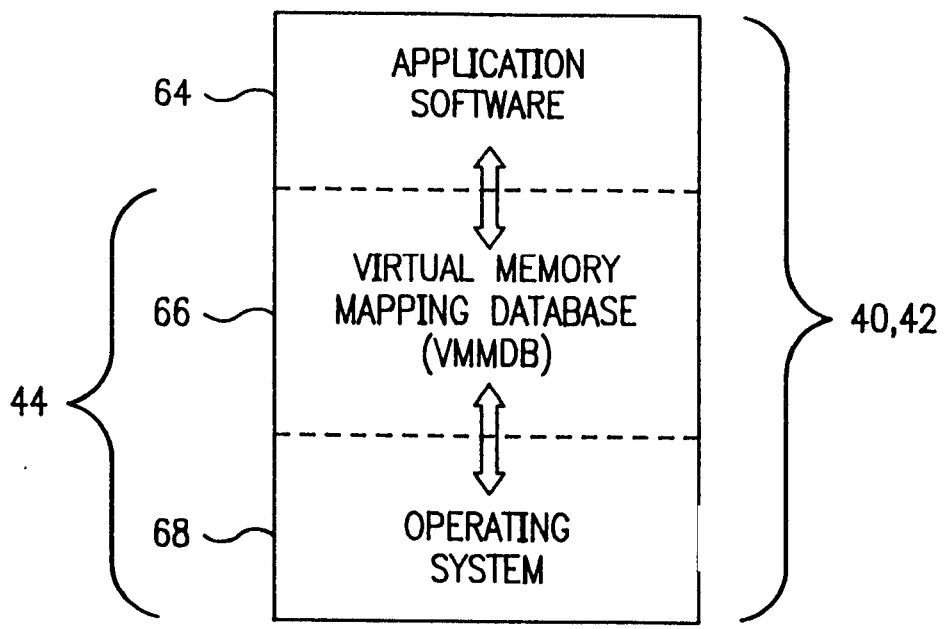
FIG. 4 illustrates how the system of the present invention interacts with other processes of a computer.

FIG. 4 illustrates the modularity and interactions of the virtual memory mapping database (VMMDB). The VMMDB 66 for a client computer 40 or a client and server computer 42 draws upon the services provided by its operating system 68. In turn, the VMMDB 66 supplies services that are used by an application program 64. At a server computer 44, the VMMDB 66 interacts with the operating system 68 to handle read and write requests from client computers and to monitor the ownership of database pages.

Figure 5:
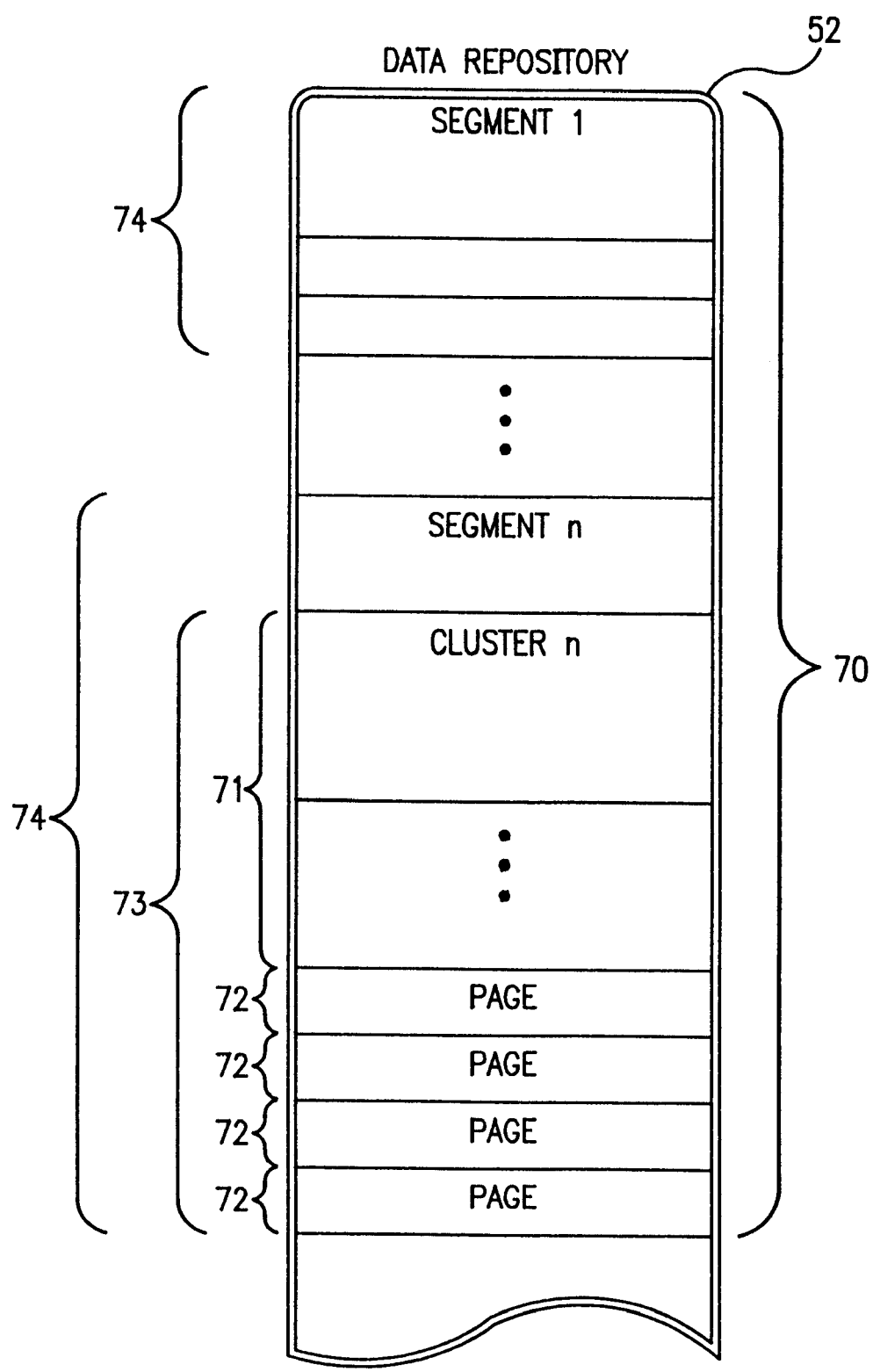
FIG. 5 is a diagram of a permanent repository of data, illustrating its division into databases, segments, clusters, and pages.

FIG. 5 illustrates the division of the permanent repository of data 52 into at least one database 70. Each database 70 is subsequently divided into at least one segment 74. Each segment 74 is subsequently divided into at least one cluster 73. Each cluster 73 contains a number of pages 72 which can be addressed by a page number 71 from the beginning of the cluster 73. Each page in turn contains a number of addressable locations (individual bytes) addressed by an offset from the beginning of the page. These addressable locations can also be thought of as being addressed by an offset from the beginning of the cluster, where this offset is computed by multiplying the page number by the number of addressable locations within a page and adding the offset within the page. That is, each addressable location in the database has an address as follows: [database, segment, cluster, offset]. A sequence of addressable locations 72 can contain a value or a pointer corresponding to a database address. A pointer can point into the current or other pages in the same database or other pages in other databases. When a client application accesses the database, the VMMDB assigns virtual addresses from the client's virtual address space to pages in the database that the client application needs to access.

Figure 6:
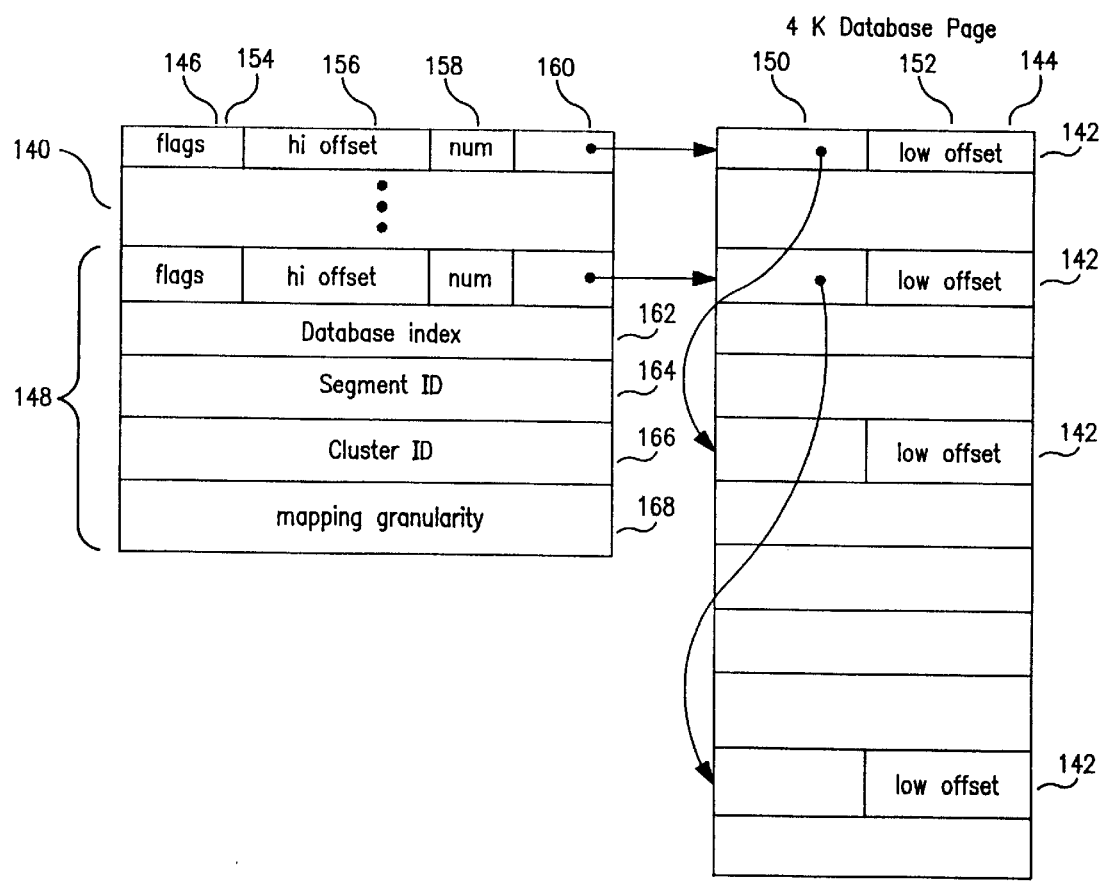
FIG. 6 is a diagram of the persistent relocation map and its associated database page.

FIG. 6 illustrates a persistent relocation map (PRM) 140 and the indexing of the PRM 140 into pointers 142 of its associated database page 144. Each page has an associated structure called a metadata structure. The page and the metadata structure are communicated between the server and the client together each time the page is accessed. The server maintains the pairing of the page with its metadata structure. The metadata structure includes the PRM and various tags, described below. The PRM and the tags describe the location and translation of pointers on a page. The PPM 140 has a plurality of entries (PMREs) 146, 148, each indexing into a page of the database. The pointers 142 on the database page are 4 byte values (8 byte values can be represented similarly). The pointers 142 are divided into two fields, an index field 150 and a low offset field 152. The index field 150 is the field that indexes the next pointer on the page that has the same PRME. The function of the low offset field 152 is to differentiate among the possible addressable locations referenced by a single PRME, which can address 4 megabytes within the target cluster. The low offset field is added to the PRME's high offset field, giving a single offset for use within the target cluster.

Each PRME 146, 148 has a flags field 154, a high offset field 156, a number field 158, and an index field 160. The flags are a new database index flag, a new segment id flag, a new cluster id flag, and a new mapping granularity flag. These flags indicate which fields will follow the head word of the PRME. A short entry PRME 146, having only a head word, assumes a target cluster ID that is equal to the contents of the num field 158 added to the target cluster ID of the previous PRME in the sequence of PRMEs constituting the PRM, or the cluster ID of the currently accessed page if there is no previous PRME. A longer entry PRME 148 has a head word and one or more fields following it. These additional fields are a database index field 162, a segment ID field 164, a cluster ID field 166, and a mapping granularity field 168. These additional fields, together with the num field 158 in the PRME head word, indicate how the target database, segment, cluster, or mapping granularity of the PRME differs from that of the previous PRME in the sequence (or, again, from the current page if there is no previous PRME). Each of these additional fields is present if and only if the corresponding flag in the PRME head word indicates. As long as PRM entries are sorted so that similar PRMEs are next to each other, shorter entries, rather than longer entries may be used. The target of each pointer in the list starting from the head pointer index 160 in the PRME head word and progressing through the index fields 150 of pointers is computed by taking the target database, segment, cluster, and mapping granularity of the PRME, and combining together the high offset field 156 of the PRME head word with the low offset fields 152 of each pointer in succession. The purpose of the mapping granularity field 168 is to indicate the multiple of address space needed by the target in units of 64 K bytes, e.g. 1×64 K, 2×64 K,etc.

Figure 7:
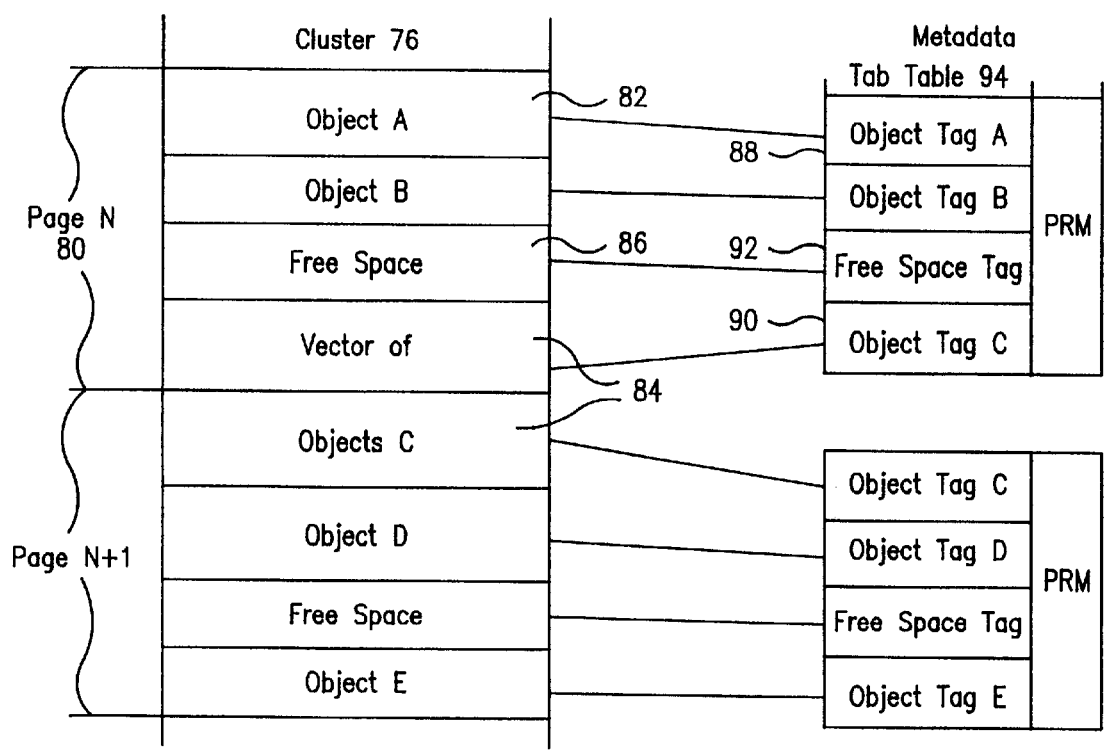
FIG. 7 is a more detailed memory diagram showing the data structure for a cluster stored in the database.

FIG. 7 illustrates a cluster in the database. Each cluster of the database 70 is divided into pages. Each page has associated with it a structure of metadata that contains data that describes the contents of the page, and includes a list of tags to identify the type of each object on the page. Objects are found only on pages so application programs will only access the pages directly, and not the metadata. The metadata holds internal data structures used only by the VMMDB. Each cluster is divided into at least one page 80. The size of a page 80 is predetermined by the computer hardware and is typically 4096 , 8192, or 16384 bytes. This description assumes a 4096-byte page without loss of generality, as larger pages can be subdivided into multiple 4096-byte pages. In a cluster 76 there are typically three types of stored objects: a single object 82, a vector of objects 84 and free space 86. An object can contain one or more values which can include pointers. Free space 86 can be understood as a special variable-sized object. More than three types of objects can be used, the three shown being representative and sufficient to implement the present invention. For each object wholly on or overlapping onto a page, a tag is placed in the corresponding metadata structure associated with the page. The sequence of tags is called a tag table 94. A single object 82 has a corresponding object tag 88. A vector of objects 84 will have a corresponding vector tag 90. Finally, a free space object 86 will have a corresponding free space tag 92.

FIGS. 8A–8C illustrate in greater detail the contents of each of the tags described in FIG. 7. An object tag 88 (FIG. 8A) has a flag field 100 indicating that the tag is for a single object, and a type code field 102. A type code describes special characteristics of an object, making it possible to have a variety of types of a single object, each type having its own characteristics. Type codes will be described in more detail in connection with the description of FIGS. 9 and 10. The vector tag 90 (FIG. 8B) has a flag field 104 indicating that the tag is for a vector, a type code field 106 similar to type code field 102, and a length field 108 for describing the length of the vector. Finally, free space tag 92 (FIG. 8C) has a flag field 110 indicating that the tag is for free space, and a length field 112 to indicate the length of the free space.

In the preferred embodiment of this invention, single object tags 88 are two bytes long. Vector tags 90 are 6 bytes long, the additional 4 bytes containing the number of elements in the vector. Free space tags 92 are 2 bytes long. The number of object types and tags used in an implementation of the present invention is dependent upon the kinds of databases used and types of manipulations performed and thus is not limited to the example described above.

The tag table 94, shown in FIG. 7, is used to find locations within a page containing database addresses that need to be relocated. The tag table is based on the principle that the contents of every page comprise an end-to-end sequence of objects, which may overlap onto the previous and/or next page in the cluster, where each object is one of a known number of types. In this example there are three types: (1) a simple object, (2) a vector (one dimensional array) of objects or (3) free space. In other words, a tag table is a data structure comprising a sequence of "tags" which directly corresponds to the sequence of objects on a page. If the first object on the page overlaps onto the previous page, a distinguished field in the page's metadata is used to indicate the distance in bytes from the head of the object to the head of the page.

Referring now to FIG. 9, a data structure called a "schema", which is part of a database, contains a set of type descriptions, one for each particular object type in the database. The schema is indexed by type codes 102 and 106 (FIGS. 8A–8C) A type description indicates the size of an object and locations of pointer values in that object. The schema is normally allocated in its own cluster in the database. Schema 120 contains a type description 122 for each different object type (as indicated by a type code) contained in the corresponding database. Each type description 122 describes one object type for which a unique type code value has been assigned. Given a type code value 102, 106 from an object tag, the VMMDB can use the type code to index into the schema 120 for the type description 122 corresponding to that object type.

The metadata for a page keeps track of all pointers that are located within that page via the tag table 94 and schema 120 (which contains type descriptions 122). The metadata also keeps track of the page-specific assignment of the persistent address space with the persistent relocation map.

Figure 10:
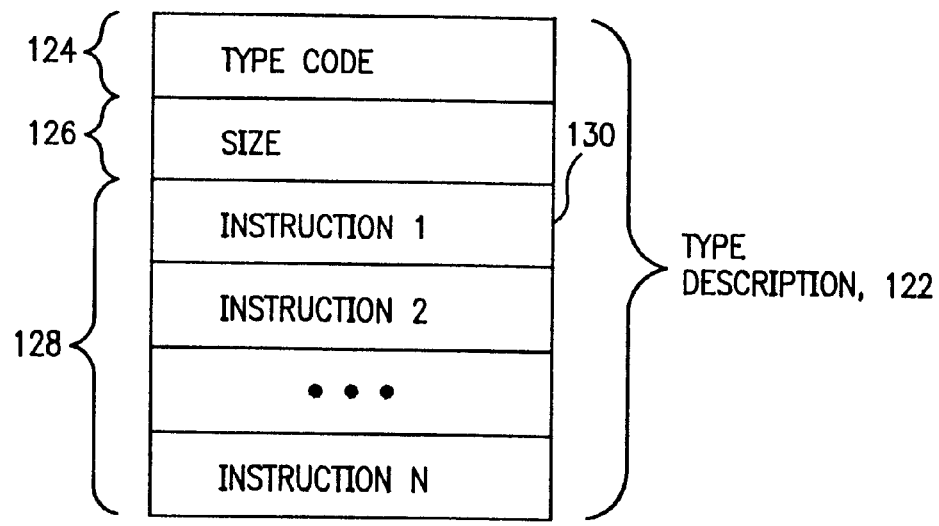
FIG. 10 is a diagram showing the data structure of a type entry to the schema of FIG. 9.

FIG. 10 illustrates the contents of a type description 122. The type description 122, indexed by its type code field 124, includes a size field 126 containing the size of an object of that type, and a set 128 of fields for indicating which locations within an object of that type contain pointers. These fields 128 are a set of instructions 130 or directives to be interpreted by the VMMDB to find locations of pointers within an object. They are normally not machine instructions that the hardware CPU understands directly.

There are two kinds of these instructions: one indicates that a pointer is at a particular offset within an object type, and the other indicates that a Virtual Function Table (VTBL) pointer is found at a particular offset within an object type. (A VTBL pointer is part of the implementation of the C++ language, and is simply a special type of pointer for which the VMMDB performs relocation. The VTBL points to a table of function pointers that an application uses for calls to virtual functions.)

Figure 11:
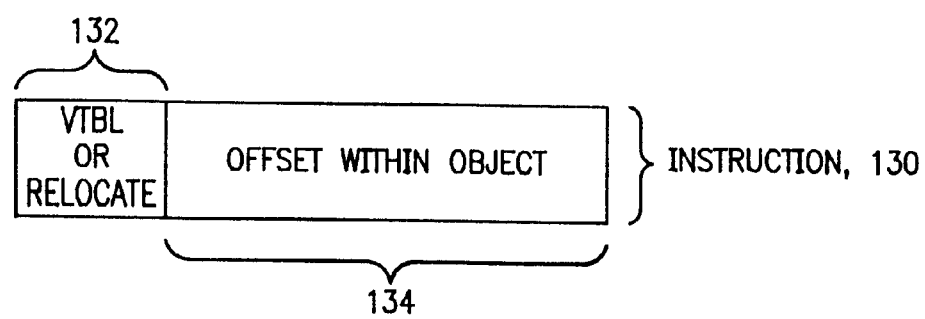
FIG. 11 is a diagram of the data structure for instructions for a type description dictionary entry.

FIG. 11 illustrates the format of an instruction 130 (FIG. 10) from a type description 122. Each instruction has a field 132 which indicates whether this pointer is a VTBL pointer or a pointer to be relocated. Field 134 indicates the offset from the beginning of the object at which the pointer resides.

Figure 12:
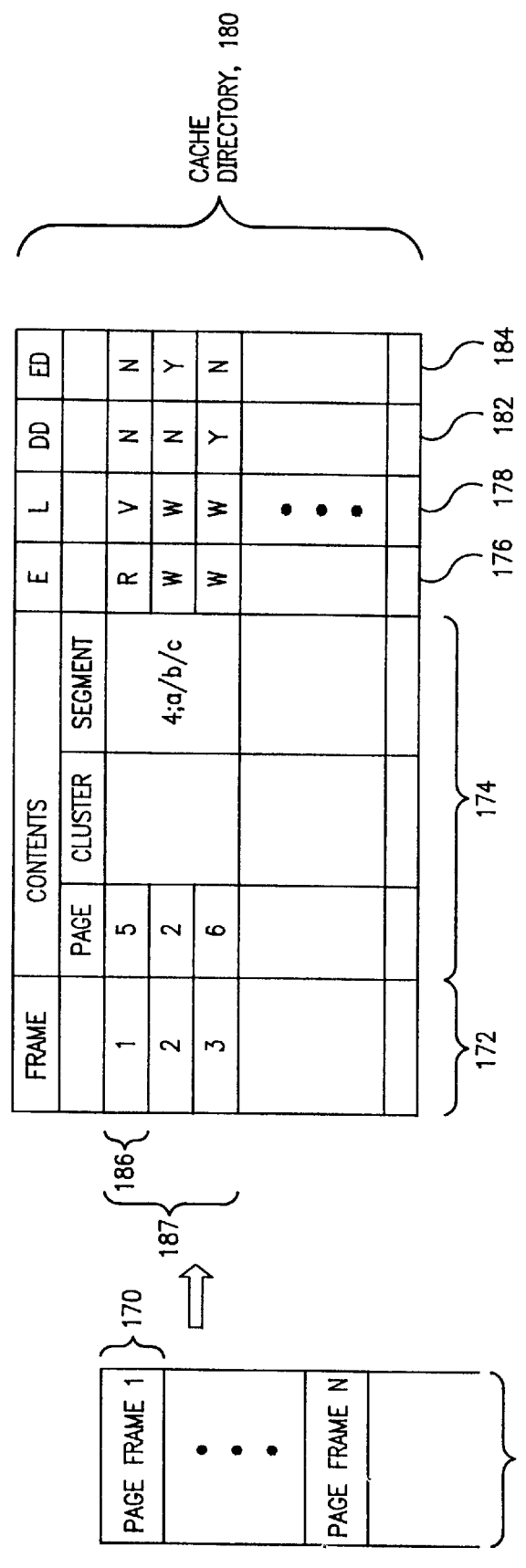
FIG. 12 is a diagram of the data structure for a client computer for monitoring the client cache.

FIG. 12 illustrates the structure of the cache memory 56 of a client computer 40 and a structure called the cache directory used by the client computer CPU 54 to monitor cache memory status. A client cache memory 56 comprises a set of page frames 170 typically within a physical cache file on the client's disk, or otherwise within a part of the operating system's swap file on the client's disk. Each page frame 170 either is free or holds a page of a database. The client computer maintains the cache directory 180 which monitors which page frames 170 contain database pages and which page frames are free. No two page frames hold the same page. Given a page of a database, e.g. page "5", cluster "n", segment "4", database "/A/B/C," the VMMDB can use the cache directory 180 to determine efficiently the page frame 170 that holds the page (the physical location of the page), or that the page is not in the cache. To this end, the cache directory 180 contains a frame field 172, indicating the number of the page frame, and a contents field 174 which identifies the page within the frame by cluster ID, segment ID, and database index. If a page is not in the cache, there is no entry for it.

Each page frame 170 in the cache directory 180 has four state values associated with it. The first two indicate the encached state 176 and the locked state 178. The encached state can either be "encached for read" (ER) or "encached for write" (EW). The locked state can either be "unlocked" (U), "locked for read" (LR), or "locked for write" (LW). To say that the state of a page is EWLR, means it is encached for write and locked for read. To say that the state of the page is ER, means it is encached for read and unlocked. The other two flags of a cache directory entry are called "downgrade when done" 182, and "evict when done" 184. The purpose of these fields are described later in connection with the flowcharts of operation.

Figures 13, 14:
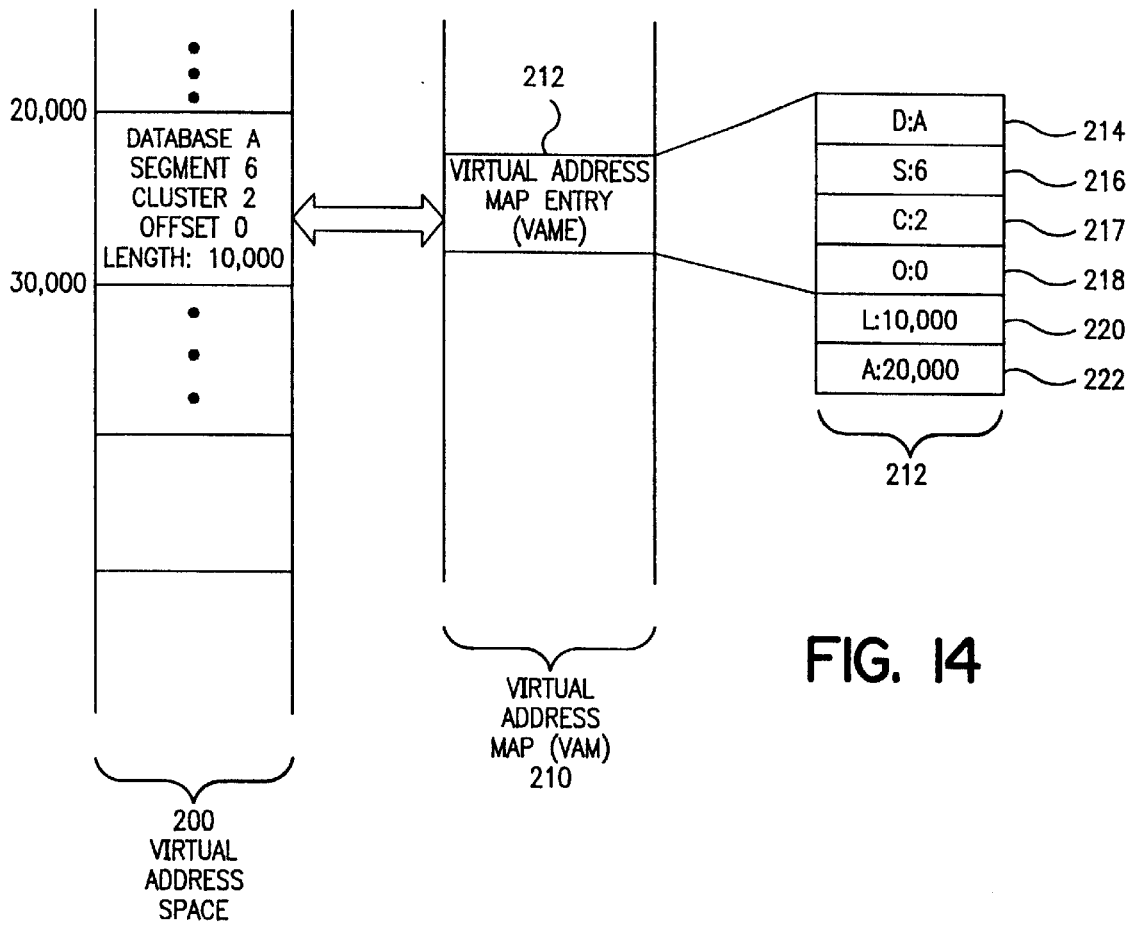
FIG. 13 is a diagram of the data structure of a server computer for monitoring ownership status of database pages.
FIG. 14 is a diagram illustrating the assignment of virtual address space to database segments.

FIG. 13 shows an ownership table. A server 44 keeps track of which client 40 (or clients) has a copy of a page from a database and whether the page is encached for read or for write at that client (or clients). The server monitors database use with an ownership table. The ownership table 190 contains entries 192 comprising three fields. A contents field 194 indicates a page of a database, with a page number, cluster number, segment number and database name. The owner field 196 indicates which client or clients are currently using that page. The owner field is preferably an array of client names. Finally, the status field 198 indicates whether the page is encached at a client for reading or for writing. Only one value needs to be stored because either all clients will have a page encached for read or only one client will have the page encached for write.

The combination of the cache directory 180 and the ownership table 190 help to maintain cache coherency. A client process can only modify the contents of a page if the page frame holding the page is locked for write by the client. A page frame can only be locked for write if it is encached for write. Verification of this status and locking are performed using the cache directory at the client. If any client has a page frame encached for write, no other client computer can have the same page in its cache. It is possible for many clients to have a copy of a page encached for read, but only one client at a time can have a copy of a page encached for write. Verification of the encached status is performed by the server using its ownership table. If no transaction is in progress in the client computer, all page frames in its cache are unlocked. If a transaction is in progress at a client, a locked page cannot become unlocked, and a page that is locked for write cannot become locked for read. That is, a page can be locked or upgraded from read to write by a client during a transaction, but cannot be unlocked nor downgraded during a transaction. Locks are released when a transaction commits. These rules correspond to the standard 2-phase locking rules for databases.

The advantage of this form of two-phase locking is in the aspect of monitoring the locks at a client computer rather than a server computer. Furthermore, data is cached and used at the client rather than at the server, and the overhead of sending locking information to the server is reduced.

Thus, data can be used for more than one transaction without extra calls to the server. That is, this caching strategy makes it possible to retain pages within the client across transactions. The addition of the page addressing method described below makes accessing the pages that remain behind in the client very fast, and it is this advantage that embodies the major claim of this invention. Standard features of two-phase locking can still be used, including prevention of write locks until all data is available and provision for "time-outs" to prevent deadlock, or other schemes to detect deadlock.

After a page is brought into a client's cache memory 56, the targets of all pointers on that page must be assigned locations in the virtual address space 200 of the client computer CPU, as illustrated in FIG. 14, and the pointers translated correspondingly before that data can be mapped to the virtual memory to be used by a client application. This process is called inbound relocation. These assignments are managed using a current address binding set 210, also called a virtual address map (VAM), with entries 212 which indicate which database, segment, cluster, offset and length, are assigned to a certain portion of the client's virtual address space. The translation of a pointer during inbound relocation requires the use of an existing virtual address map entry (VAME) if one exists for the target of the pointer, or the construction of a new VAME for the target and incorporation of that VAME into the VAM. The translation also requires that a region of the client's virtual address space be reserved for and assigned to the VAME if it does not yet have such a reservation and assignment. Finally, the translation of the pointer can write into the pointer the virtual address for the pointer computed as the offset from the top of this assigned region of virtual address space equal to the offset computed from the combination of the pointer's low offset field and its PRME's num field, high offset and/or offset field, minus the offset of the VAME within the cluster.

Virtual address map entries (VAME) 212, which are also referred to as bound or assigned DSCO handles, are similar to the entries 146, 148 of the persistent relocation map 140 (see FIG. 6). The virtual address map 210 indicates the regions of the virtual address space 200 to which database regions are assigned, while the persistent relocation map 140 indicates the regions of the database address space. Each VAM entry 212 contains a database field 214 indicating the database in which a region resides, a segment field 216 indicating the segment of that database in which the region is located, a cluster field 217 indicating the cluster in the segment of that database, and an offset field 218 indicating the offset or distance in addressable units (bytes) from the beginning of the cluster at which the region begins. There is also a size field 220 indicating the length of the region, which is analogous to the mapping granularity field of the PRME. Finally, there is an address field 222 which indicates the virtual address which is assigned to the first addressable location of the region.

Figure 15:
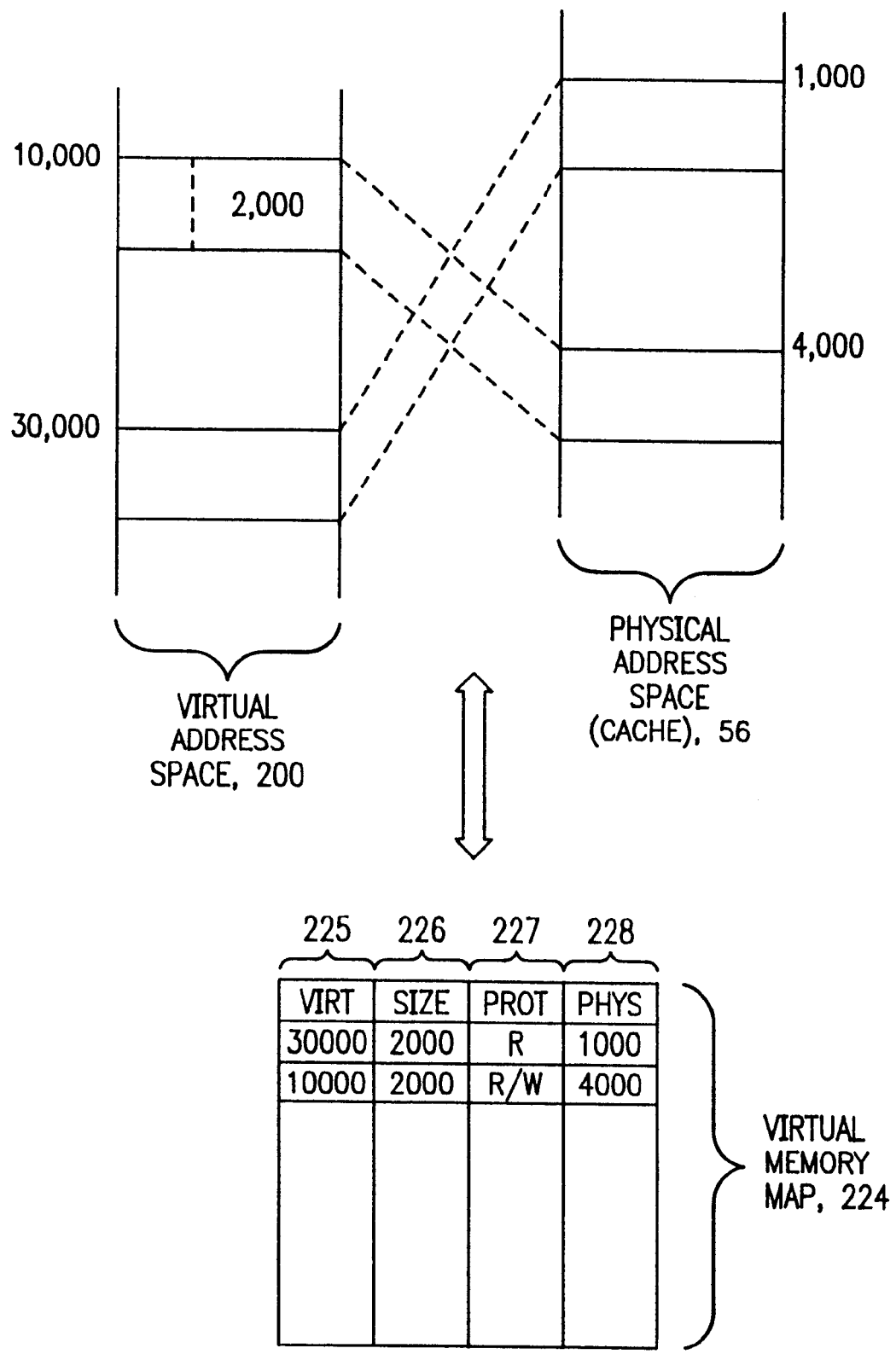
FIG. 15 is a diagram illustrating the mapping data into virtual memory (physical addresses of the cache to virtual addresses)

In order for an application to access data pages in the cache, that data must be mapped to virtual memory. FIG. 15 illustrates schematically the relationship of the virtual address space 200 to the cache 56 (usually implemented as a separate file on the client's disk, or as part of the client's swap file) after mapping by the client computer has been performed. A virtual memory map 224 is constructed by the operating system 68 of the client computer, in a manner which is typical for most computer systems. The virtual memory map indicates the cache file addresses to which the virtual addresses are mapped. A virtual memory map typically has an entry for each page including a virtual address 225, a length 226, its corresponding cache file location 228 and the read or write protection state 227 of that page.

FIGS. 16A–16C illustrate the relationship among the cache directory, the virtual address map and the operating system's virtual memory map. The cache directory 180 (FIG. 12) indicates the cache file address (page frame) in which a database page is found in cache memory 56. The virtual address map 210 (FIG. 14) indicates the virtual address to which a database page is assigned, or to which it will be mapped if used by an application. The virtual memory map 224 (FIG. 15) is constructed by the operating system from information given it by the VMMDB from the cache directory 180 and the virtual address map 210. The VMMDB instructs the operating system to map a database page into virtual memory, giving it the cache file address, in which the database page is located, from the cache directory 180 and the virtual address, to which it is to be mapped, from the virtual address map 210.

Figure 17:
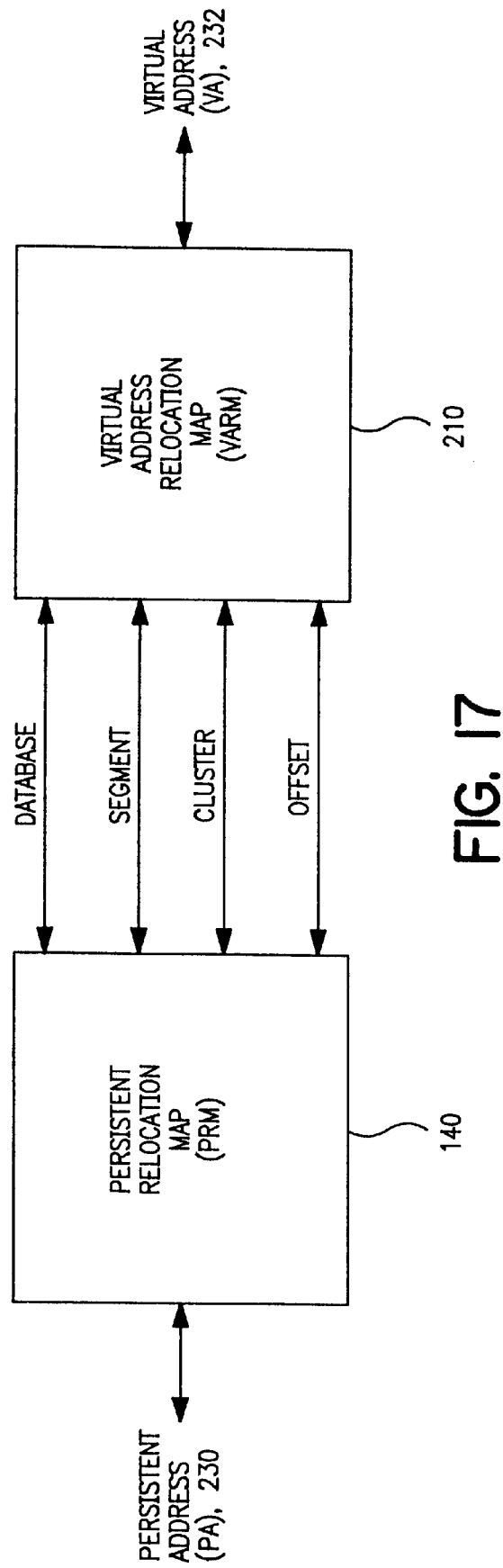
FIG. 17 is a diagram illustrating the method of relocating a persistent address to a virtual address.

When a database page is first brought into a cache, prior to mapping into virtual memory, pointers in the page are still in their external representation as threaded pointers to PRM entries. When the page is mapped into virtual memory these pointers need to be translated from their external form into their corresponding virtual addresses before the application can use the data. The translation procedure, also called "inbound relocation", is schematically illustrated in FIG. 17.

The combination of the threaded pointers constituting the external format of the page, and that page's PRM, encode the target database, segment, cluster, and offset of each pointer on the page. The database, segment, cluster and offset can then be used to find the corresponding entry in the virtual address relocation map 210 from which the correct virtual address 232 can be obtained.

Figure 18:
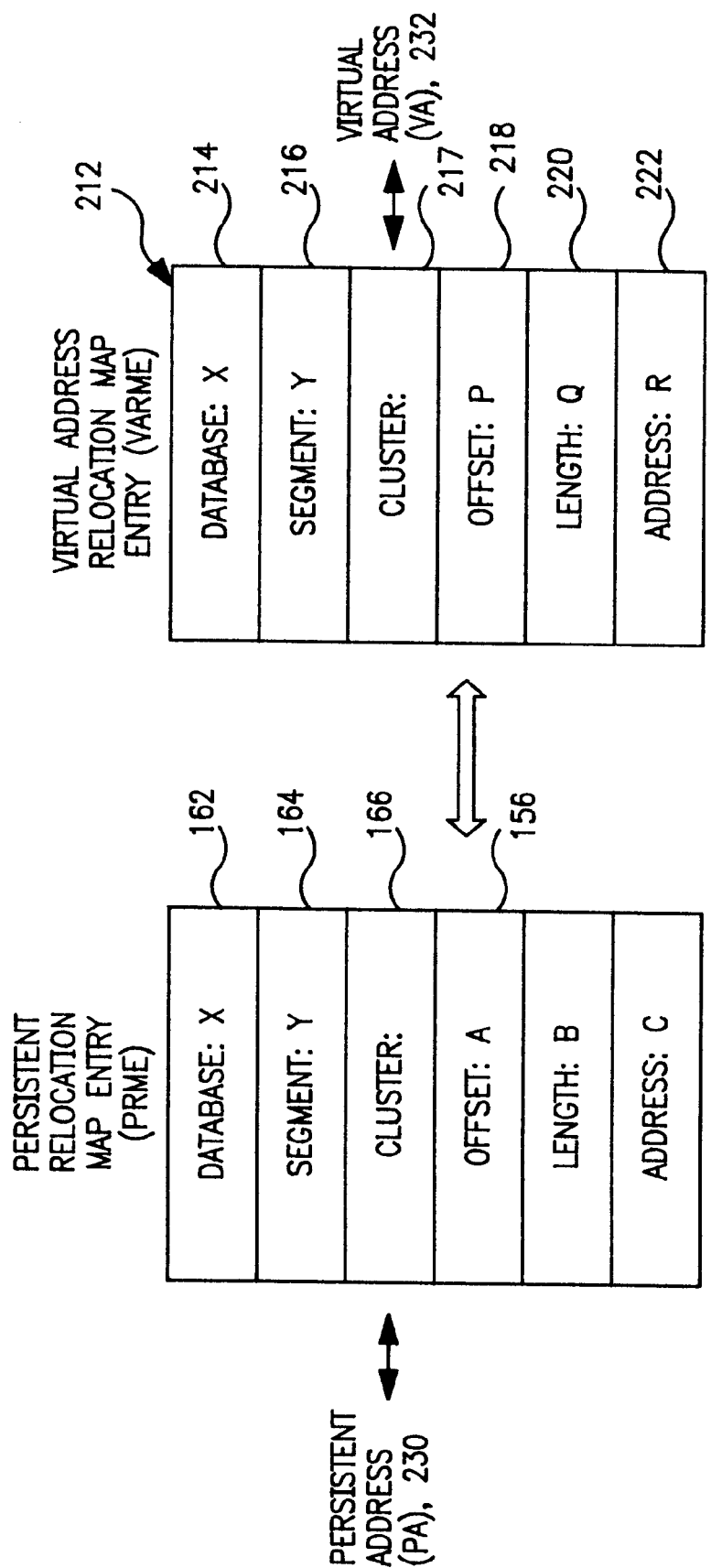
FIG. 18 is a detailed representation of the mapping of a persistent address to a virtual address.

FIG. 18 describes inbound relocation in more detail. The PRMEs within the page's PRM are processed in sequence, enabling each PRME to compactly encode its target with respect to the target of the previous PRME, if there is one, or otherwise of the containing cluster of the page. Referring back to FIG. 6, for each PRME in the sequence, the PRME's target 4 megabyte range is calculated from its num field 158, its hi offset field 156, and any of the four additional fields that may follow the head word, those fields being the database index field 162, the segment ID field 164, the cluster ID field 166, and the mapping granularity field 168. The calculation proceeds as follows: If the PRME has a database index field, then the target database is determined by translation of this index using a table contained in the source database of the page. If the PRME does not have a database index field, the target database for this PRME is the same as the target database of the previously processed PRME for this page if there was one, or otherwise it is the source database of the page itself. If the PRME has a segment ID field, then the target segment is indicated by this ID. If the PRME does not have a segment ID field, but does have a database index field, then the target segment is indicated by using the value of the num field 158 as a segment ID. If the PRME has neither a database index field nor a segment ID field, the target segment is the same as the target segment of the previously processed PRME for this page if there was one, or otherwise it is the source segment of the page itself. If the PRME has a cluster ID field, then the target cluster is indicated by this ID. If the PRME does not have a cluster ID field, but does have either a database index field or a segment ID field or both, then the target cluster is indicated by using the value of the num field 158 as a cluster ID. If the PRME does not have any of the database index, segment ID, or cluster ID fields, then the cluster ID is computed by adding the value of the num field 158 to the cluster ID of the previously processed PRME for this page if there was one, or otherwise to the ID for the source cluster of the page itself. The mapping granularity field of the PRME, if it exists, indicates the amount of address space that is required to be contiguous for assignments of address space to the target region so far indicated by the target database, segment, and cluster. If the mapping granularity field is not present, but either of the database index field or segment ID field is present, then the mapping granularity for the target is set to the default value of 64 kilobytes. If none of the mapping granularity field, database index field, or segment ID field is present, then the mapping granularity for the target is the same as that of the previously processed PRME for this page if there was one, or otherwise is the default value of 64 kilobytes. The translation so far has produced a target database, segment, cluster, and mapping granularity for the target region.

Following translation of the PRME as described above, the PRME's head pointer index field 160 is traversed to find the first pointer on the page that uses the PRME in combination with its low offset field 152 to encode its target. Successive pointers are linked through the index fields 150 as indicated in FIG. 6. All pointers reachable from the head pointer index field 160 of the PRME will have the same target database, segment, and cluster in common, these being the values produced by the above mentioned translation of the PRME. The actual targets of these pointers will differ only by offset within the target cluster. The offset of each such pointer is calculated by combining the hi offset field 156 of the PRME with the low offset field 152 of each pointer.

The database, segment, and the offset are then used to find a corresponding virtual address map entry (VAME) 212, also referred to as the assigned DSCO handle. The corresponding VAME is the one for which the target offset is greater than or equal to the value P of the offset field 218 but less than the sum of that offset P and the value Q of the length field 220 of that entry. (target offset<P+Q). The pointer's target virtual address can then be computed by adding to R (the first virtual address of the VAME) the difference P—target offset. In order to translate a virtual address to the external format for the pointer during outbound relocation, the opposite procedure is followed.

When a page of data is taken from the database and put into the cache, the page is relocated inbound. That is, the pointers in that page are translated from their external format to virtual addresses. The process of sending a page of data back to the server is called outbound relocation. The process of refreshing the pointer information on a data page remaining in the cache after this information may have become obsolete across address space generations is called forward relocation.

Figures 19, 20:
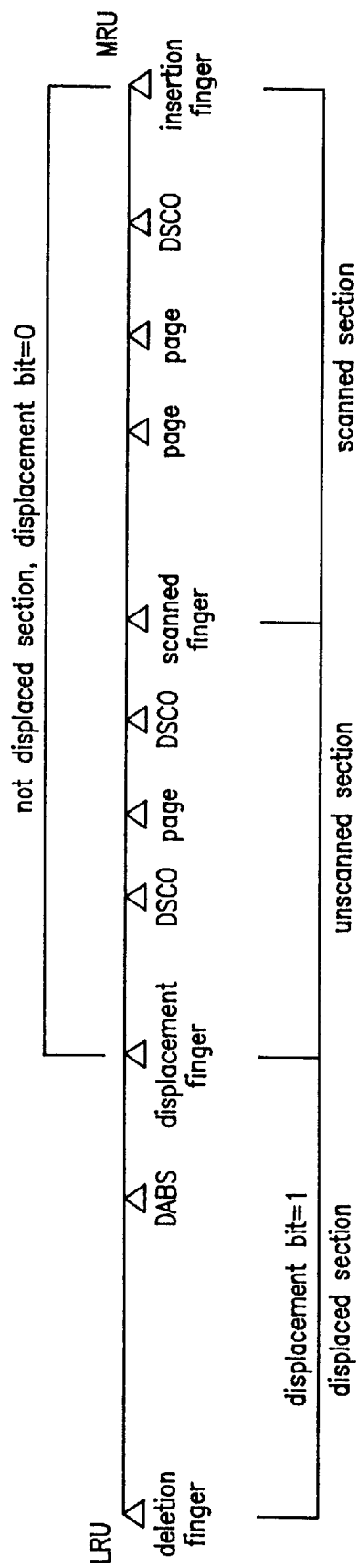
FIG. 19 is a first relopt queue according to principles of the present invention.
FIG. 20 is a second relopt queue at to according to principles of the present invention.

FIG. 19 shows a relocation optimization queue (relopt queue), a data structure used for the relocation optimization method of the present invention. Relocation optimization, as defined here, is the process of reducing the frequency of forward relocations. Maintenance of cached data is achieved through the use of the relopt queue. The relopt queue manages and indexes virtual address space within the PSR across successive address space generations, where an address space generation is typically a single transaction, but may be only part of a transaction or a group of consecutive transactions.

Figure 23:
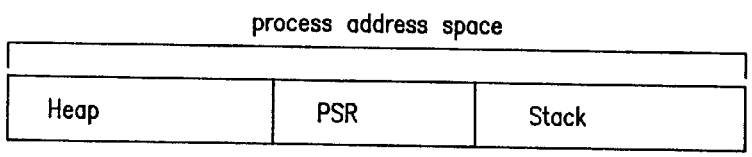
FIG. 23 is a diagram of the PSR space according to principles of the present invention.

FIG. 23 shows the process address space of the heap and the stack including a PSR (persistent storage region) section where pages in the caches are made accessible to the application, and which encompasses all targets of pointers to persistent locations. When a client application accesses the database, the client application assigns virtual addresses from within the PSR portion of its virtual address space to the pages the application needs to access. This assignment of virtual addresses is performed only for the region of the particular page to be accessed and the regions having the pages that the particular page points to. An assignment of virtual addresses is contained within each client accessing the database so each client has its own virtual address assignment. A typical PSR is 128 megabytes in size, although that may vary from application to application. Each session has a PSR.

The duration of an address space generation is under the control of the client application, and is determined by the client application's requirement that the set of pointers it reads and/or traverses within the PSR must not change until specific points within a computation are reached. These points, when they are indicated by the client application, delimit the address space generations.

There is one relopt queue per session. Each client on the system has one session (although a single application process may contain multiple clients, and hence multiple sessions) and thus the terms client and session may be used interchangeably in the description of the relopt queue.

In the present embodiment of the invention, the relopt queue is implemented as a doubly linked list so that objects may be inserted and removed quickly from anywhere along the queue as needed. One end of the queue is referred to as the head, and the other end is referred to as the tail. In the figures illustrating the relopt queue, the right end is always the head. The ordering of elements within the queue, due to the function of the relopt mechanism, can also be described as having the most-recently used (MRU) elements closer to the head and the least-recently used (LRU) elements closer to the tail. An informal and convenient ordering that can also be used to describe the relopt queue is that the younger elements are closer to the head and the older elements are closer to the tail, although the terms older and younger here are not meant to imply a fixed chronology. The objects in the relopt queue include fingers, database segment cluster offset (DSCO) handles, page handles, and displaced address binding sets (DABS), each of which will be detailed below.

A finger is an element that designates a position in the relopt queue that is important to the function of the relocation optimization method. In the basic relocation optimization method, the various fingers are an insertion finger, a scanned finger, a displacement finger, a deletion finger, and a modulus finger. In the advanced relocation optimization method, there may be multiple insertion fingers.

In the basic relocation optimization method, the insertion finger is fixed at the head of the queue which is also referred to as the "youngest" end of the queue. The insertion finger indicates the only point in the queue where page and DSCO handles are inserted into the queue.

The finger to the left of the insertion finger is the scanned finger. The scanned finger is by definition older than the insertion finger and younger than the displacement finger and the deletion finger. The scanned finger and the insertion finger delimit a segment of the queue in which the page handles correspond to pages on which all the pointers are valid, and are guaranteed to remain valid for the duration of the current address space generation without further need of processing. The scanned finger's position is fixed in the relopt queue until a new address space generation is started, at which point the scanned finger is moved to the head of the relopt queue, just older than the insertion finger. The scanned finger is just older than the oldest page handle whose generation number is the current generation and whose scanned flag is set. Generation numbers and scanned flags will be discussed below.

The purpose of forward relocation is to allow the client application to access, over the course of a succession of address space generations, quantities of persistent data that exceed what can fit into the PSR at any one time. Note that, in some systems, forward relocation is replaced by a combination of outbound relocation and subsequent inbound relocation—but this replacement is not an important distinction with regards to the current invention, as either a distinct forward relocation, or a combination of outbound and inbound relocation will work similarly. Forward relocation is the preferred method, since it incurs a cost that is less than half of the cost of combining outbound and inbound relocation to accomplish the same task.

The primary purpose of the current invention is to reduce the frequency of forward relocation (or a substitute performing the same function, as mentioned previously) in a manner that is transparent to the client application, thereby improving the overall performance of the combined system of the client application and VMMDB. Whenever the combined system has realized the benefit of not requiring a forward relocation when it otherwise would without the current invention in place, the system is said to have benefited from relocation optimization, or relopt.

The relopt queue is a structure within the current invention that has as a purpose the organizing of address space bindings such that these bindings are roughly ordered by recency of use, with the most-recently used (MRU) nearest the head of the queue. Once all available virtual address space within the PSR is consumed by bindings, older (LRU) bindings that are not in use in the current address space generation can be displaced, making the virtual address space that they consumed available for use by new bindings. By preferring to displace older bindings, and only performing such displacements as necessary to make space available for new bindings, the current invention combined with the temporal locality property typical of most client applications decrease the frequency of the situation in which a page in the client cache contains invalid pointers when it is next used by the client application. Since only such pages require forward relocation, the frequency of forward relocations is reduced.

As mentioned, the relopt queue organizes address space bindings. These bindings are represented within the queue by objects called DSCO handles, where DSCO is an abbreviation for database, segment, cluster, and offset. DSCO handles are also entries in the virtual address map. Each DSCO handle refers statically to a persistent region designated by a database, segment, cluster, offset and size when the cluster requires only the default mapping granularity of 64 kilobytes. A second but similar variety of DSCO handle refers to clusters having a mapping granularity greater than 64 kilobytes, where the mapping granularity and size of such clusters are the same—a simplifying implementation decision that is not crucial to the function of the current invention. Unless otherwise mentioned, references in this description to DSCO handles will refer to either variety. DSCO handles do not contain separate fields for database, segment, and cluster. Instead, they contain a single field that refers to a cluster handle, where that cluster handle refers to a specific cluster in a specific segment in a specific database. Thus, DSCO handles that refer to the same cluster can share the same cluster handle—this is an implementation decision that reduces the size of DSCO handles, but is not otherwise crucial to the function of the current invention. DSCO handles also contain a virtual address field, which can either be null or the value of a virtual address within the PSR. If this field is null, then the DSCO handle is in a state referred to as unassigned or unbound. If this field is not null, then the DSCO handle is in a state referred to as assigned or bound, and the bound DSCO handle is also referred to as a VAME. The virtual address space region starting at the address contained in this field, and continuing for a number of bytes equal to the value of the size field is considered to be reserved for use by both pointers referring to targets within the persistent range as well as the pages constituting persistent data within that persistent range. This virtual address space region is also said to be assigned to or bound to the DSCO handle. While the DSCO handle is assigned, the virtual address space region assigned to it cannot be assigned to any other DSCO handle. The bound DSCO handle is a bi-directional mapping between a contiguous region of the process address space within the PSR and an equal-sized contiguous region of persistent address space. The sum of the sizes of all DSCO handles between the displacement finger and the insertion finger is limited by the size of the PSR.

Only bound DSCO handles appear as entries in the virtual address map managed by the VMMDB system, and indexed by virtual address. All DSCO handles currently existing in the client appear as entries in another table called the DSCO map, which is indexed by database, segment, cluster, and offset. This DSCO map is used primarily by inbound relocation, when translation of a PRME and pointer combination has been completed to the point of identifying the target database, segment, cluster, and offset of the pointer. The use of the DSCO map by inbound relocation will be discussed in more detail later.

All DSCO handles currently existing within the client, whether bound or not, are elements within the relopt queue.

In addition to DSCO handles, the relopt queue contains elements called page handles. A distinct page handle exists for each page that is currently present in the client's cache and has undergone inbound relocation more recently than outbound relocation. The placement of page handles relative to DSCO handles within the relopt queue obeys an invariant which states that a page handle must always appear within the relopt queue at an older position than the DSCO handles corresponding to the persistent regions referenced by pointers contained on the corresponding page, and to the DSCO handle corresponding to the persistent region in which the page represented by the page handle is a member. The purpose of this invariant is to allow each page handle to divide the relopt queue into two regions relative to the position of the page handle. The region older than the page handle does not contain any DSCO handles that must be bound in order for the page to be validly accessible by the client application. The region younger than the page handle contains all DSCO handles that must be bound in order for the page to be validly accessible by the client application (and possibly many others). This division ensures that the displacement of a bound DSCO handle for the purposes of making virtual address space available will only affect the validity of pages represented by page handles at older positions than the DSCO handle being displaced.

Other elements are present in the relopt queue as well. One class of such elements, referred to collectively as fingers, are used to delimit segments of the relopt queue. In the basic method of the current invention, there are five such fingers for each relopt queue.

The first finger is called the insertion finger. It is always fixed at the head of the relopt queue, and so is synonymous with the head. In the advanced method of the current invention, there can be multiple insertion fingers, all but one of which are not fixed to the head of the queue. The advanced method will be described later.

The second finger is called the scanned finger. The section of the queue between the scanned finger and the insertion finger is the scanned section. The scanned section is made empty at the beginning of an address space generation by moving the scanned finger to a position immediately older than the insertion finger. During an address space generation, elements are added to the scanned section. The validity of elements within the scanned section is preserved by the method for the duration of the address space generation—meaning that DSCO handles within the scanned section are not displaced, and so all pointers contained on pages corresponding to page handles within the scanned section remain valid for the duration of the address space generation.

The third finger is called the displacement finger. The displacement finger is always at an older position than the scanned finger. The section of the queue between the displacement finger and the scanned finger is the unscanned section.

The fourth finger is called the deletion finger. It is always fixed at the tail of the relopt queue, and so is synonymous with the tail. The section of the queue between the deletion finger and the displacement finger is the displaced section. All unbound DSCO handles are in the displaced section. Also, all page handles representing pages containing currently invalid pointers are in the displaced section. Note that it is just these pages that contain invalid pointers which require forward relocation before they can be used by the client application again during their stay within the client cache.

At the start of the database application, that is at time $t_0$, the deletion, displacement, scanning and insertion fingers are located next to each other in the queue and there are no other elements in the relopt queue as shown in FIG. 20.

The fifth finger is called the modulus finger. Unlike the other fingers, the modulus finger is not used to delimit sections of the queue. It is instead used as a technique to offset integer overflow in the computation of address space generation numbers. The function of the modulus finger is separate from the rest of the function of the method, and will be described later.

The final class of elements present in the relopt queue are the displaced address binding sets. Each displaced address binding set (DABS) is a map from virtual addresses to DSCO handles, similar in structure to the current address binding set. There can be multiple DABSs for each client, the first of which is created at the first displacement of a DSCO handle. The function of a DABS is to keep track of information about previous bindings of DSCO handles to virtual addresses. The DABSs are used during forward relocation. Each DABS also has a link to the next younger DABS in the relopt queue, if there is one.

During the course of its operation, the client application will issue a sequence of transactions. The client application will also issue a sequence of address space generations, which can by default correspond exactly to the transactions, or can, under more precise control of the client application, correspond to portions of individual or sequences of transactions. During the transactions, the client application will issue requests to the client component of the VMMDB for pages of persistent data. If a requested page already exists in the client's cache, the client component of the VMMDB will determine if the page needs further translation (forward relocation) and perform that translation if necessary, and then the VMMDB will make the page accessible to the client application by mapping it into the PSR and protecting it appropriately for the desired access, as well as updating the states of the corresponding page handle and cache directory entry appropriately. If a requested page is not already in the client's cache, the client component of the VMMDB will issue a request to the server component. Requests to the server component for pages will often involve locking issues with other clients that are simultaneously making transactions against the same persistent data, but these issues will be understood to be similar to those of the standard two-phase locking database model, and will not be explored further here. Once the server responds to the client's request, the page is placed in the client's cache, a page handle and cache directory entry are created for it and properly initialized, the page undergoes inbound relocation, and then the VMMDB will make the page accessible to the client application as by mapping it into the PSR and protecting it appropriately for the desired access. Thus, both inbound and forward relocation are motivated by the client application's requests to access pages of persistent data, the difference being that forward relocation only takes place for pages already in the client's cache, while inbound relocation always takes place when a page is brought into the client's cache when not currently present there.

Figure 21:
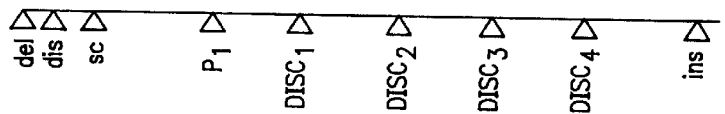
FIG. 21 is the relopt queue of FIG. 20 after inbound relocation of a first page of data.

FIG. 21 illustrates a typical relopt queue following the first inbound relocation of a page. During inbound relocation, the page handle corresponding to the page $P_1$ is placed into the relopt queue just older than the insertion finger, and the PRM for the page is processed along with pointers contained on the page as mentioned previously. For each pointer which has its target translated according to this process, the target is looked up in the DSCO map. There are three possible results of this lookup: there may be a bound DSCO handle for the region surrounding the target, there may be an unbound DSCO handle for the region surrounding the target, or there may be no DSCO handle for the region surrounding the target. If there is a bound DSCO handle for the region surrounding the target, then the virtual address to which it is bound, when added to the difference between the pointer's target's offset and the DSCO handle's regions offset, produces the virtual address translation value for the pointer. This value is written over the external form of the pointer. If there is an unbound DSCO handle for the region surrounding the target, then the DSCO handle must first become bound before processing of the pointer translation can proceed. The process of binding an unbound DSCO handle will be discussed in detail below. Once the DSCO handle is bound, processing of the pointer translation continues as it did for the bound DSCO handle. If there is no DSCO handle for the region surrounding the target, one is created, placed into the virtual address map, bound, and processing of the pointer translation continues again as it did for the bound DSCO handle. In all three cases, the DSCO handle is then placed into the relopt queue just older than the insertion finger, removing it first from its previous position in the relopt queue unless it was just created. Inbound relocation proceeds in this way until all pointers on the page have been translated. In the example in FIG. 21, the DSCO handles added to the relopt queue in this way are $DSCO_1$, $DSCO_2$, $DSCO_3$, and $DSCO_4$ Inbound relocation then sets the state of the page handle corresponding to the page to be the "in use and scanned" state, then maps the page into the PSR at the appropriate address with the appropriate protection, making the page accessible to the client application, and returns control to the client application.

Figure 22:
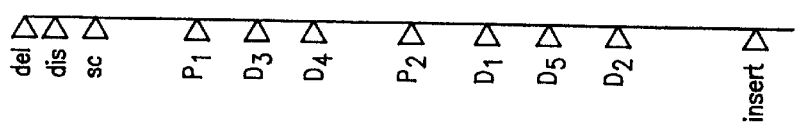
FIG. 22 is the relopt queue of FIG. 21 after inbound relocation of a second page of data.

FIG. 22 continues the example of FIGS. 20 and 21 by illustrating what happens when a second page $P_2$ is brought in and that page is in the range covered by $DSCO_2$, and contains pointers that have targets covered by $DSCO_1$ and a new DSCO handle $DSCO_5$—(which is created, assigned, and placed in the DSCO map and CABS, as was done for the other four DSCO handles) the page undergoes inbound relocation, and is inserted at the insertion finger, and then $DSCO_1$, $DSCO_5$, and $DSCO_2$ inserted at the insertion finger.

The states of a page handle are "in use and scanned", "in use but not scanned", "not in use", and "not in use and displaced". The "in use" designation in both of the first two states corresponds to page handles of pages which are accessible to the client application during the current address space generation. The "scanned" designation corresponds to page handles that are in the scanned section of the relopt queue. The "displaced" designation corresponds to page handles that are in the displaced section of the relopt queue. Note that all scanned page handless are in use, and all displaced page handles are not in use. The "in use but not scanned" and "not in use" states correspond to page handles in the unscanned section of the relopt queue.

Page handles are put in use individually as the requests for pages by the client application are processed. Page handles are taken out of use en masse when the client application indicates that the current address space generation is over.

Figure 24:
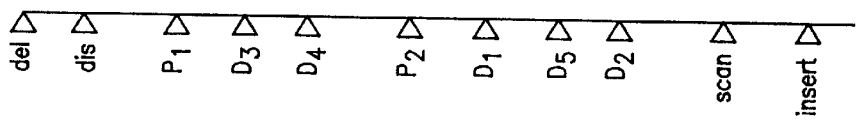
FIG. 24 is the relopt queue of FIG. 22 after committing the transaction.

As mentioned previously, the current address space generation is ended by moving the scanned finger to a position just older than the insertion finger, as illustrated in the continued example of FIG. 24. Merely moving the scanned finger this way does not change the states of the page handles to out of use. To speed up the process of taking a large number of page handles out of use simultaneously, the current invention uses a single global current address space generation counter for the client in conjunction with an address space generation field in each page handle. Both the global counter and the fields are 32 bits wide. The global counter takes on values in the range of 1 to $2^{32}-1$ inclusive, while the fields take on values in the range of 0 to $2^{32}-1$ inclusive. Whenever the current address space generation is ended, the global counter is incremented, and if it overflows to 0 is set immediately to 1. When a page handle is put into either the "in use and scanned" or "in use but not scanned" states, the address space generation field of the page handle is set to the value of the global current address space generation number. Thus, when the value of a page handle's address space generation field is equal to the value of the global current address space generation counter, the page handle is designated as in use. If the value of the field is not equal to the value of the global counter, then the page handle is either in the "not in use" or "displaced" states, depending on its position in the relopt queue. Thus, the single act of incrementing the global counter at the end of an address space generation effectively changes the state of all page handles that were in use during that address space generation without requiring that each page handle be visited in turn.

This process is susceptible to error due to integer overflow, when the global counter is set to a value less than a previous value. The possible error here is that a page handle may exist that has as the value of its field this lower value, set during some previous address space generation, yet it would be erroneous to interpret the fact that the field is now equal to the global counter as meaning that the page handle is in use. It is the function of the modulus finger within the present invention to prevent this erroneous condition from occurring by setting the address space generation field of all page handles that have not been put into an in use state within fewer than $2^{32}-1$ generations to zero. The modulus finger accomplishes this task by moving past (from older to younger position) one element in the relopt queue per address space generation, looping back to the tail when it passes the head. The current invention performs this movement at the end of an address space generation, but it is sufficient to perform it at any time. If the element moved past by the modulus finger is a page handle, and its address space generation field is not currently equal to the global current address space generation counter, then the field is set to 0, which is a value that will not be equal to the global counter regardless of integer overflow because the value of the global counter is maintained to be always at least 1. The correctness of this process is based on the restriction that there be fewer than $2^{32}-1$ elements in the relopt queue. This restriction is imposed indirectly by restrictions of the computer hardware on memory consumption, and so does not have to be imposed directly by the current invention.

To bind an unbound DSCO, the method must find a virtual address region with size equivalent or larger than the size field of the DSCO handle that is not currently bound to any other DSCO handle. The virtual address map can be queried to determine if such a region exists. If a suitable region does exist, and the region is of the requested size, then it is bound to the DSCO handle. If a suitable region does exist, and the region is larger than the requested size, a portion of the region equal in size to the size requested is bound to the DSCO handle, and the rest remains unbound. If not suitable region exists, one can be created by unbinding one or more other bound DSCO handles that are not currently needed by page handles in use in the current address space generation. The current invention uses the displacement finger to find such other bound DSCO handles and unbind them with the following displacement procedure. The element immediately younger than the displacement finger is examined. If the element is a DSCO handle, then it must be a bound DSCO handle, since all unbound DSCO handles exist in the displaced section to the older side of the displacement finger. The DSCO handle found this way is unbound, with its virtual address field set to 0, and the corresponding entry in the virtual address map modified to show that the virtual address region previously bound to that DSCO handle is now free. An entry that references the DSCO handle is added to the youngest DABS in a way that can be indexed by any address in the virtual address region previously bound to the DSCO handle, and such that the start of the virtual address region can be determined. The DSCO handle is then placed to the immediate older side of the displacement finger. If the size of the virtual address space region freed by this operation, when coalesced with free regions that may exist to either or both of its sides is sufficient to fulfill the request for space, the request is fulfilled in a manner equivalent to what was described above when the region was found by querying the virtual address map. If the coalesced free region is not large enough, then the displacement procedure examines the next element.

If the element examined by the displacement procedure is the scanned finger, then all remaining bound DSCO handles must exist solely within the scanned section. Since all such bound DSCO handles must retain their current bindings for the duration of the current address space generation, none can be unbound to provide free virtual address space for consumption by other DSCO handles. In such a case, the client has exhausted virtual address space, and this condition is signaled to the client application. The client application can then choose to end the current address space generation and continue, or terminate the page request by aborting the current transaction.

If the element examined by the displacement procedure is a page handle, then this page handle must be in either the "in use but not scanned" or "not in use" states, since all page handles in the displaced state are to the older side of the displacement finger in the queue, and all page handles in the "in use and scanned" state are younger than the scanned finger, and so unreachable by the displacement procedure. If the page handle examined is in the "not in use" state, it is moved to be just older than the displacement finger, set so that its head DABS field refers to the current youngest DABS, and set to be in the displaced state. If the page handle is in the "in use but not scanned" state, then further processing is required to move the page handle out of the way of the displacement procedure so that the procedure can continue in its attempt to find bound DSCO handles. This further processing is called scanning. Scanning is similar to relocation in that the object tags contained in the page's metadata are used to iterate through the objects on the page to find all pointers on the page. Unlike relocation, pointer values are not changed by scanning. Instead, the pointers used to index into the virtual address map to find the bound DSCO handles corresponding to the targets of the pointers. First, the page handle itself is moved to the head of the queue. Then, during scanning, each pointer on the page is used to index into the virtual address map to find the corresponding bound DSCO handle. Each DSCO handle found in succession is then moved to the head of the queue. The DSCO handle corresponding to the region in which the page is a member is similarly moved. The scanning procedure thus moves the page handle out of the way of the displacement procedure, while maintaining the invariant that all DSCO handles required by a page handle are at younger positions than the page handle. Obviously, all DSCO handles moved by this position are no longer reachable by the displacement procedure for the duration of the current address space generation, however other bound DSCO handles may still exist in the unscanned section of the queue. The displacement procedure then resumes its search by again examining the element immediately younger than the displacement finger.

If the element examined by the displacement procedure is a DABS, then it must be the youngest DABS since all older DABSs can exist only in the displaced section. The DABS is moved to be just older than the displacement finger. A new empty DABS is created and placed in the relopt queue at a position in the scanned section just older than the page handle being relocated. The displaced DABSs next younger field is set to point to the new DABS, and the new DABS becomes the youngest. This is the only time that new DABS are created or moved within the relopt queue, so the action of this procedure itself ensures that only one DABS can be younger than the displacement finger.

Figure 25:
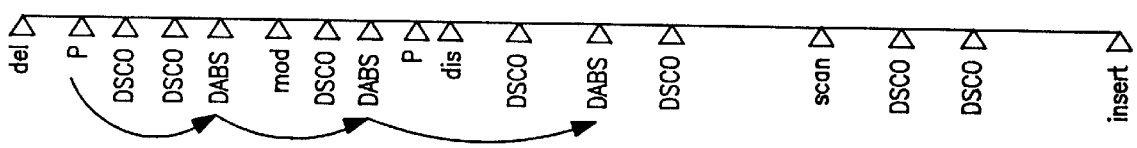
FIG. 25 is a third relopt queue having chained DABS structures among the queue elements according to principles of the present invention.

Returning to the description of how requests for pages by the client application are handled by the client component of the VMMDB, if the page requested already exists in the client's cache, then the page handle for it exists and is in either the "not in use" or displaced states. The page handle cannot be in an in use state, because then the client application would not be requesting the page, it would instead just use the page in its present state. If the page handle is in the "not in use" state, then it must be within the unscanned section of the relopt queue. The position invariant of the relopt queue guarantees that all DSCO handles required by the pointers on this page are at younger positions than the page, and so must be bound. Furthermore, these DSCO handles could not have become unbound since the point in time when they were last used to provide translations for the pointers on the page in some previous address space generation, because the only process that unbinds DSCO handles is the displacement process, and the displacement process would first have marked the page handle itself as displaced. The current invention will change the state of this page from "not in use" to "in use but not scanned" without further examination or translation of pointers or maps. This ability of the current invention to allow a portion of the pages in the cache to be used in successive address space generations without further translation is its primary benefit over other procedures. The current invention also provides that this portion of pages in the cache will be a substantial portion, due to the interaction of the organizational effects of keeping more recently used page and DSCO handles at younger positions in the queue relative to less recently used ones, with the temporal locality property of most client applications, If the page handle for the page being requested by the client application is in the displaced state, then some or all of the pointers on the page may no longer be valid with respect to the current set of virtual address space bindings represented in the virtual address map. Pages in this state must first undergo forward relocation before being made accessible to the client application. Forward relocation, like inbound relocation and scanning, uses the object tags in the page's metadata to locate pointers within the page. Unlike inbound relocation or scanning, the targets for those pointers cannot be found by translation from the PRM (which is only used by inbound relocation) or by indexing into the virtual address map. Instead, forward relocation uses DABSs to translate pointers on displaced pages. FIG. 25 shows a relopt queue with a chain of DABS starting with the head DABS pointer of such a page handle. The page handle is first moved to the head of the queue. For each pointer encountered on the page, the value of the pointer is used to index into the DABS referred to by the head DABS field of the page handle. If an entry is found in the DABS, the DSCO handle referred to by the entry can be in one of three states. The DSCO handle can be bound to the same virtual address region it was bound to immediately before the entry was added to the DABS—a fortuitous but possible outcome. In this case, the value of the pointer is valid and does not require translation. The DSCO handle can be in the unbound state. In this case, the DSCO handle must become bound, using the same process described previously that may require the displacement procedure, and the value of the pointer is then set to be the start address of the newly bound virtual address space region plus the difference between the old value of the pointer and the start of the old virtual address space region recorded in the DABS entry. The DSCO handle can be in the bound state, but bound to a different virtual address region than was recorded in the DABS entry. In this case, the value of the pointer is set to be the start address of the bound region plus the difference between the old value of the pointer and the start of the old virtual address space region recorded in the DABS entry. In all cases, the DSCO handle found is moved to the head of the queue.

If the DABS does not have a suitable entry for the pointer, the next DABS in the chain reached by the next DABS field in the DABS just examined is queried next. This procedure repeats until either a DSCO handle is found, or the end of the DABS chain is reached. If a DSCO handle is found, it is treated as described in the previous paragraph. If the end of the DABS chain is reached without finding a DSCO handle, then the corresponding DSCO handle must not have become displaced since the time when the page handle was displaced, and so is still bound to the same virtual address space region it was bound to at the time the page handle became displaced. In this case, the pointer is valid and does not require translation. The DSCO handle is still moved to the head of the queue as with others found by different cases within forward relocation, so as to preserve the position invariant.

After all pointers on the page are processed by forward relocation, the page handle is set to the "in use and scanned" state, and the page is made accessible to the client application by mapping it to the appropriate address and protecting it appropriately for the request.

Modification of pages in the "in use but not scanned" state is handled specially by the current invention. Prior to making the page writable by the client application, the page is scanned, similarly to what would happen if the page was examined during the displacement procedure. This scanning is necessary to prevent the accidental unbinding of bound DSCO handles that must retain their current binding for the duration of the current address space generation.

Writable pages in the cache at the end of an address space generation that is not also the end of a transaction have their page handles moved to a position just younger than the displacement finger. This is done because writable pages may have acquired new or different pointer values during since they became writable, and the bound DSCO handles for these pointer values may not necessarily be younger than the page handle at its position during the address space generation. The position immediately younger than the displacement finger is guaranteed to be older than all currently bound DSCO handles, satisfying the position invariant. It would seem that, during the address space generation, the writable pages may have violated the position invariant. Due to the fact that all pages are in the scanned section prior to becoming writable, there is still no way for the displacement process to create a problem by displacing required DSCO handles. This can be considered to be either an acceptable exception to the invariant, or the invariant can be restated as applying only outside the scanned section.

Outbound relocation, the one type of relocation remaining to be discussed, occurs whenever a copy of a page containing modifications must be sent back to the server for safe keeping. This condition typically occurs when a transaction is committed, for pages that were modified during the transaction. This condition also occurs when a modified page is evicted from the cache during a transaction, either in order to create space in the cache for other pages needed by the client application, or because the client application has explicitly requested the eviction. Outbound relocation, like all of the other forms of relocation, is performed using the object tags contained in the metadata for the page. The purpose of outbound relocation is to construct a new PRM for the page (the old PRM having been discarded after being used by inbound relocation), and translating the pointers on the page into external form. Outbound relocation can occur for pages with page handles in either of the four different states. For pages with page handles in the displaced state, outbound relocation uses the DABS chain in exactly the same way as forward relocation. With outbound relocation, unbound DSCO handles do not need to get bound and no DSCO handles need to be moved to the head of the queue. For pages with page handles in the "not in use" or "in use and scanned" states, all required DSCO handles can be found by indexing the virtual address map by pointer value, because all such DSCO handles must still be bound. Again, these DSCO handles are not moved to the head of the queue. For pages in the "in use but not scanned" state, all DSCO handles can again be found by indexing the virtual address map by pointer value, but these DSCO handles must be moved to the head of the queue, giving outbound relocation of such pages the same effect on the positions of DSCO handles as scanning. Each time a pointer is encountered during outbound relocation, and the corresponding DSCO handle is found by one of the above procedures, a "sample" PRME is created for the pointer and inserted into a "sample" PRM for the outbound relocation. This sample PRME contains all of the PRME fields 148 in FIG. 6. If a sample PRME with identical fields already exists in the sample PRM, then that is used instead. The sample PRME, unlike a normal PRME, also contains a tail index field. If a new sample PRME is used, then both the head and tail indexes are set to refer to the current pointer being translated. If an existing sample PRME is used, the index field of the pointer referenced by the tail index field of the PRME is set to refer to the current pointer being translated. In both cases, the starting virtual address of the region bound to the DSCO handle is subtracted from the current pointer, the DSCO handle's offset is added to the pointer, the index field 150 of the current pointer is set to 0. The effect of using the tail index field of the sample PRME is to create the required threaded list of pointers starting from the head index field in the appropriate order.

Once pointers have been translated by outbound relocation as above, the sample PRM is sorted by database, segment, and cluster. The sorted sequence is then examined in consecutive order to produce a new compact PRM for the page by eliminating fields that are redundant with the previous PRME in the sequence. The PRM is then placed in the metadata for the page, and sent with the page (or a copy of the page: if the page is only being outbound relocated due to transaction commit, then the client retains a copy in its cache) to the server.

The function of the deletion finger is analogous to a garbage collection mechanism. The client application can request that the memory overhead for elements managed by the relopt queue should not exceed some specified threshold unless necessary to preserve the validity of in-use pages. During creation of elements for the relopt queue, memory consumption is monitored. When memory consumption reaches the specified threshold, the current invention examines the element next to the deletion finger (younger than the deletion finger, as no elements are older). If that element is a DSCO handle or DABS, the element is deleted. If that element is a page handle, the corresponding page is evicted from the cache, and the page handle is deleted. If that element is the displacement finger, the displacement process is executed until some other element appears next to the deletion finger. If the displacement finger is already next to the scanned finger, then the displacement process is not executed, and the deletion process cannot continue. If the execution of the displacement process results in an element other than the displacement finger appearing next to the deletion finger, then the deletion process can be performed on that element. The deletion process continues until either the amount of memory consumed by relopt queue elements falls below the specified threshold, or the deletion, displacement, and scanned fingers all appear adjacently in the relopt queue.

Ending an address space generation increments the global address space generation counter (subject to overflow correction as described previously) and unmaps or otherwise by protection makes all pages inaccessible to the client application. Pages that were readable are no longer, and pages that were writable are no longer either readable or writable.

Address bindings, however, are not touched, meaning that the virtual address map remains unchanged, as do all bound DSCO handles.

The advanced version of the current invention adds the feature of nested address space generations. These nested address space generations are started and stopped as needed by the client application. The purpose of nested address space generations is to allow the client application to specify that a unit of work during an outer address space generation may consume further address space that is not required when the work is finished. Since such units of work may be nested arbitrarily, the advanced version of the current invention allows a correspondingly arbitrary nesting of address space generations. When a nested address space generation is ended, but while the next outer address space generation is still in effect, bindings that were added during the nested generation can be displaced as needed for use by future bindings.

The largest difference between the basic version and the advanced version is that the advanced version has multiple insertion fingers, with only one fixed to the head of the queue. Also, insertion fingers can appear anywhere to the younger side of the displacement finger. Insertion fingers to the younger side of the scanned finger are considered active, those to the older side of the scanned finger are considered inactive—a flag on the insertion finger keeps track of the active/inactive state, which is initially active for a new insertion finger, and is set to inactive when the corresponding nested address space generation ends. There is no global address space generation counter in the advanced version. Instead of an address space generation field, each page handle has an insertion finger field that references an insertion finger or null. The "in use" designation for page handles is determined by examining the insertion finger field. If the field is null, the page handle is not in use. If the field is not null, the page handle is in use if and only if the referenced insertion finger is current. A page handle is then put into use by setting its insertion finger field to refer to the insertion finger for the innermost active nested address space generation. The modulus finger is not needed in the advanced version.

Displacement of a page handle sets the insertion finger field to null, instead of setting the no longer present address space generation field. When the displacement process encounters an insertion finger, the insertion finger is deleted. Thus the number of insertion fingers in the relopt queue does not grow without bound. Earlier deletion of an inactive insertion finger is possible using a reference counting procedure.

When an address space generation, nested or outer, ends, the scanned finger is moved to a position just younger than the insertion finger corresponding to the ending address space generation, and the insertion finger's state is set to inactive. When an address space generation, nested or outer, starts, a new insertion finger is created and placed into the relopt queue at a position immediately younger than the scanned finger. The insertion finger has a field indicating its nested level, which is one greater than the nested level of the innermost nested active insertion finger at the time the new insertion finger is created, with 0 as the level of the outermost. Thus, successively nested address space generations will correspond to successively older insertion fingers with successively higher nested levels. The sections of the relopt queue between active insertion fingers are referred to as multiple scanned sections, with the active insertion finger younger than such a section considered to be the owner of the section.

An insertion finger field is added to the DSCO handles as well. This field is set to the insertion finger owning the scanned section that the DSCO handle is moved to during any operation that moves DSCO handles.

Let the nested level of a page or DSCO handle be determined by examining the insertion finger field. If the field is null, or refers to an inactive insertion finger, the nested level is considered positive infinity. Otherwise, the nested level is that of the referenced active insertion finger. The nested level of page and DSCO handles is used to ensure a new invariant—that a page or DSCO handle is never moved to a region where it will receive a higher nested level than its current nested level.

Thus, during relocation or scanning, when moving DSCO handles, the current nested level of the DSCO handle is examined prior to any motion, and the DSCO handle is only moved if the insertion finger it is being moved to has an equal or lower level than the nested level of the DSCO handle.

During a transaction, there is always a single innermost address space generation, and a corresponding single innermost active insertion finger, although which insertion finger this is changes as address space generations are started and ended A single global variable keeps track of the current innermost active insertion finger. The motion of page handles and DSCO handles in the basic version is modified so that the motion always results in insertions into the relopt queue at the position just older than this insertion finger, and the insertion finger of the page or DSCO handle so moved is set to refer to this insertion finger.

When an address space generation ends, the corresponding insertion finger's state is set to inactive, and the scanned finger is moved to a position just younger than it. Address space generations must end in innermost to outermost order, so that the scanned finger is never moved to a position younger than an active insertion finger. As address space generations end, the corresponding insertion finger and the contents of its scanned section become elements of the unscanned section due to this movement of the scanned finger. Thus, these elements become susceptible to displacement, and may become displaced sooner than elements still residing in scanned sections of active insertion fingers. This order of susceptibility to displacement provides the nesting behavior visible to the client application.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. Apparatus for segregating data within a cache in a database system wherein pointers in said cache are virtual address pointers translated from persistent address pointers, comprising:

a) means for providing a transient relocation optimization queue to organize virtual address space and recycle said virtual address space across a series of transactions by a single client application having a plurality of fingers to designate positions in said queue, and a plurality of entries corresponding to cached data in the cache, b) means for delimiting said queue into a plurality of sections with said fingers, a first section for containing entries for data used in a current transaction by said client application, a second section for containing entries that can be used by said client application without updating pointers, and a third section containing entries that cannot be used by said client application without updating pointers;

c) means for servicing requests from said client application for access to said data in said cache and for data not yet in said cache;

d) means for incorporating data into said cache that is not yet in said cache and translating pointers in said queue to update pointer information to reflect said incorporated data in said queue;

e) means for maintaining said updated pointer information for data previously incorporated into said cache;

f) means for removing data from said cache as it is no longer required by said client application and translating pointers in said queue to update pointer information to reflect said removed data in said queue;

g) means for updating pointers when providing access to said data corresponding to said entries in said third section of said queue, thereby providing fast access to data in said cache corresponding to said first and said second sections of said queue; and h) means for incrementally recycling said virtual address space used by entries in the second and third sections of said queue for use by data being incorporated into the cache, such that the address space so recycled will tend to be the virtual address space which is least recently used.

2. Apparatus for controlling the translation of references in data to virtual addresses in a computer system having a virtual memory system defining a virtual address space, and including at least one cache memory for temporarily storing data, a processing unit, and an application program utilizing the processing unit and data, the processing unit including means for requesting data utilizing a virtual address to access said data in the at least one cache memory, the virtual memory system including means for mapping virtual addresses to physical addresses, and means for detecting where access to data requested by the means for requesting is not permitted at the virtual address utilized by the means for requesting, the data consisting partly of intra- and interdata references, said method comprising:

(a) means for starting and ending address-space generations, much as transactions a manner by which the application program informs said method of the start and end of each term in a sequence of terms such that during each term all of the virtual address translations of references contained in data accessed by the application during the term must remain valid;

(b) means for segregating the data in each cache memory into three groups such that all of the data in the first group was accessed during the current term, the data in the second group is a mix of the remainder of data accessed during the current term and still resident in the cache and of data accessed in prior terms, and the data in the third group is the remainder of the data accessed during prior terms that is still resident in the cache;

(c) means for segregating the translations of references contained in said data into said three groups such that all of the translations of references in data contained in the first group are in the first group, some of the translations of references in data in the second group are in the first group and the remainder are in the second group, and some of the translations of references in data in the third group are in the first group, some in the second group, and the remainder in the third group;

(d) means for segregating the virtual address space consumed by said translations of references into the first and second groups such that all of the virtual address space consumed by a translation in either the first or second group is contained in the same group as the corresponding translation, and such that no translations in the third group consume virtual address space and are thus not immediately usable;

(e) means for forward relocation of data in a way that data in the third group which the application program attempts to access is incorporated into the first group, the translations of references in said data that are present in the second group are incorporated into the first group, the translations of references in said data that are present in the third group are provided with virtual address space and adjusted to make use of this virtual address space, and all said translations of references and corresponding virtual address space are incorporated into the first group;

(f) means for page displacement by resegregation of data in the second group unaccessed during the current term, having the virtual address space used by translations of references contained in it recycled, into the third group;

(g) means for DSCO handle displacement by resegregation of translations of references in the second group, where said references are only in data in the third group or no longer in the cache, into the third group with a corresponding freeing of the virtual address space consumed by said translations such that said virtual address space can be consumed by different translations;

(h) means for incorporating data in the second group accessed during the current term, along with translations of references in the second group for said data and the virtual address space consumed by said translations, is incorporated into the first group;

(i) means for inbound relocation by incorporating data not yet in the cache into the cache, translating its references from an external form into virtual addresses, and incorporating said data along with the virtual address space consumed by translations of its references is into the first group; and (j) means for outbound relocation translation references on data in the cache that is modified by the application program into an external form suitable for storage outside of the cache.

3. A method of segregating data within a cache in a database system wherein pointers in said cache are virtual address pointers translated from persistent address pointers, comprising the steps of:

a) providing a transient relocation optimization queue to organize virtual address space and recycle said virtual address space across a series of transactions by a single client application having a plurality of fingers to designate positions in said queue, and a plurality of entries corresponding to cached data in the cache, b) delimiting said queue into a plurality of sections with said fingers, a first section for containing entries for data used in a current transaction by said client application, a second section for containing entries that can be used by said client application without updating pointers, and a third section containing entries that cannot be used by said client application without updating pointers;

c) servicing requests from said client application for access to said data in said cache and for data not yet in said cache;

d) incorporating data into said cache that is not yet in said cache and translating pointers on each database page in said queue to update pointer information to reflect said incorporated data in said queue and maintaining said updated pointer information for data previously incorporated into said cache;

e) removing data from said cache as it is no longer required by said client application and translating pointers in said queue update pointer information on a per page basis to reflect said removed data in said queue;

f) updating pointers when providing access to said data corresponding to said entries in said third section of said queue, and g) incrementally recycling said virtual address space used by entries in the second and third sections of said queue for use by data being incorporated into the cache, such that the address space so recycled will tend to be the virtual address space which is least recently used; thereby providing fast access to data in said cache corresponding to said first and said second sections of said queue.

4. A method as set forth in claim 3 wherein said processing steps are arranged for recycling virtual address space used by entries in the second and third sections of said queue for use by data being incorporated into the cache, such that the address space so recycled will tend to be that which is least recently used.

5. A method of segregating data within a cache in a database system wherein pointers in said cache are virtual address pointers translated from persistent address pointers, comprising the steps of:

providing a relocation optimization queue having a plurality of fingers to designate positions in said queue, and a plurality of entries corresponding to cached data in the cache, delimiting said queue into a plurality of sections with said fingers, a first section for containing entries for data used in a current transaction by a client application, a second section for containing entries that can be used by said client application without updating pointers, and a third section containing entries that cannot be used by said client application without updating pointers;

servicing requests from said client application for access to said data in said cache and for data not yet in said cache;

incorporating data into said cache that is not yet in said cache and translating pointers on each database page in said queue to update pointer information to reflect said incorporated data in said queue;

removing data from said cache as it is no longer required by said client application and translating pointers in said to queue to update pointer information on a per page basis to reflect said removed data in said queue; and updating pointers when providing access to said data corresponding to said entries in said third section of said queue, thereby providing fast access to data in said cache corresponding to said first and said second sections of said queue wherein said processing steps are arranged for recycling virtual address space used by entries in the second and third sections of said queue for use by data being incorporated into the cache, such that the address space so recycled will tend to be that which is least recently used;

moving said fingers as needed to properly maintain the homogeneity of the said sections delimited by said fingers;

preserving translations between pointers in the cache and virtual addresses as needed by said client application, at least until said client application specifies that some or all said translations may be recycled;

moving said fingers as needed to record the allowed recycling of said translations by said client application, without requiring further computation (other than the alteration of the memory protection on pages in the cache) to accommodate said recycling;

preserving many said translations after said client application specifies that they may be recycled, so that future re-use of said translations will not require relocation computations;

incorporating displaced address binding sets to record recycled translations, so that requests by said client application for the re-use of entries in said third section of said relocation optimization queue can be accommodated by searching over said recycled translations within said displaced address binding sets, and thus either arrive at or create appropriate translations for said entries; and removing said entries and said displaced address binding sets from said relocation optimization queue when they are no longer needed.

6. A method for controlling the translation of references in data to virtual addresses in a computer system having a virtual memory system defining a virtual address space, and including at least one cache memory for temporarily storing data, a processing unit, and an application program utilizing the processing unit and data, the processing unit including means for requesting data utilizing a virtual address to access said data in the at least one cache memory, the virtual memory system including means for mapping virtual addresses to physical addresses, and means for detecting where access to data requested by the means for requesting is not permitted at the virtual address utilized by the means for requesting, the data consisting partly of intra- and inter-data references, said method comprising:

(a) providing a manner by which the application program informs said method of the start and end of each term in a sequence of terms such that during each term all of the virtual address translations of references contained in data accessed by the application during the term must remain valid, (b) segregating the data in each cache memory into three groups such that all of the data in the first group was accessed during the current term, the data in the second group is a mix of the remainder of data accessed during the current term and still resident in the cache and of data accessed in prior terms, and the data in the third group is the remainder of the data accessed during prior terms that is still resident in the cache, (c) segregating the translations of references contained in said data into said three groups such that all of the translations of references in data contained in the first group are in the first group, some of the translations of references in data in the second group are in the first group and the remainder are in the second group, and some of the translations of references in data in the third group are in the first group, some in the second group, and the remainder in the third group, (d) segregating the virtual address space consumed by said translations of references into the first and second groups such that all of the virtual address space consumed by a translation in either the first or second group is contained in the same group as the corresponding translation, and such that no translations in the third group consume virtual address space and are thus not immediately usable;

(e) incorporating data in the third group, which the application program attempts to access, into the first group, incorporating the translations of references in said data, that are present in the second group, into the first group, providing the translations of references in said data that are present in the third group with virtual address space and adjusting them to make use of this virtual address space, and wherein all said translations of references and corresponding virtual address space are incorporated into the first group;

(f) segregating in the second group unaccessed during the current term, having the virtual address space used by translations of references contained in it recycled, into the third group (g) segregating translations of references in the second group, where said references are only in data in the third group or no longer in the cache, into the third group with a corresponding freeing of the virtual address space consumed by said translations such that said virtual address space can be consumed by different translations, (h) providing a process by which data in the second group accessed during the current term, along with translations of references in the second group for said data and the virtual address space consumed by said translations, is incorporated into the first group;

(i) providing a process by which data not yet in the cache is incorporated into the cache, its references translated from an external form into virtual addresses, and said data along with the virtual address space consumed by translations of its references is incorporated into the first group; and (j) providing a process by which references on data in the cache that is modified by the application program can be translated into an external form suitable for storage outside of the cache.

\* \* \* \* \*